US009037189B2

United States Patent
Saito et al.

(10) Patent No.: US 9,037,189 B2
(45) Date of Patent: May 19, 2015

(54) POSITIONING SERVER DEVICE AND POSITIONING CONTROL METHOD

(75) Inventors: Yoshiko Saito, Kanagawa (JP); Shinkichi Ikeda, Kanagawa (JP); Seigo Nakao, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/235,732

(22) PCT Filed: Jul. 20, 2012

(86) PCT No.: PCT/JP2012/004620
§ 371 (c)(1),
(2), (4) Date: Jan. 28, 2014

(87) PCT Pub. No.: WO2013/021552
PCT Pub. Date: Feb. 14, 2013

(65) Prior Publication Data
US 2014/0228048 A1    Aug. 14, 2014

(30) Foreign Application Priority Data
Aug. 5, 2011    (JP) ................. 2011-172433

(51) Int. Cl.
*H04W 24/00*        (2009.01)
*H04W 4/02*         (2009.01)
*G01S 5/02*         (2010.01)

(52) U.S. Cl.
CPC .............. *H04W 4/023* (2013.01); *G01S 5/021* (2013.01); *G01S 5/0252* (2013.01)

(58) Field of Classification Search
CPC .......... H04M 1/72419; H04W 8/2345; H04W 64/00
USPC ................... 455/550.1, 418, 456.1
See application file for complete search history.

(56) References Cited

U.S. PATENT DOCUMENTS 6,946,950 B1 *  9/2005  Ueno et al. ................... 340/10.1
8,848,585 B2 *  9/2014  Chan et al. ................... 370/311
(Continued)

FOREIGN PATENT DOCUMENTS

CN    101718859 A    6/2010
JP    2009-055138 A    3/2009
(Continued)

OTHER PUBLICATIONS

Wi-Fi Location-Based Services—Design and Deployment Considerations, tech. rep., Cisco Systems, 2006, URL: https://learningnetwork.cisco.com/docs/DOC-3418.
(Continued)

*Primary Examiner* — Danh Le
(74) *Attorney, Agent, or Firm* — Pearne & Gordon LLP

(57) ABSTRACT

A positioning server device comprises: an input unit which receives measurement information of radio waves which are transmitted between an access point and a client; a radio wave map administration unit (10) which administers radio wave map data which denotes an estimation of a correspondence relation between the radio wave measurement information and a spatial location; and a positioning unit (13) which positions the location of the client based on the radio wave measurement information and the radio wave map data. The radio wave map administration unit (10) administers first map data which relates to a fixed positioning range where it is possible for a client to be positioned to be present conventionally, and second map data which relates to an extended positioning range wherein a possibility arises that the client to be positioned may be present according to particular conditions, as radio wave map data.

10 Claims, 17 Drawing Sheets

(56) References Cited

U.S. PATENT DOCUMENTS

| | | |
|---|---|---|
| 8,866,674 B2 | 10/2014 | Meyer et al. |
| 2007/0135070 A1* | 6/2007 | Chiu et al. ............... 455/226.2 |
| 2009/0131038 A1* | 5/2009 | MacNaughtan et al. ... 455/422.1 |
| 2010/0033512 A1* | 2/2010 | Kito ............................ 345/690 |
| 2010/0090899 A1 | 4/2010 | Zhao et al. |
| 2010/0144275 A1* | 6/2010 | Satou ........................... 455/41.2 |
| 2010/0325712 A1* | 12/2010 | Kakuta et al. ................... 726/7 |
| 2011/0103360 A1 | 5/2011 | Ku et al. |
| 2012/0170560 A1 | 7/2012 | Han et al. |
| 2013/0247117 A1* | 9/2013 | Yamada et al. ................ 725/93 |
| 2013/0342400 A1 | 12/2013 | Meyer et al. |

FOREIGN PATENT DOCUMENTS

| | | |
|---|---|---|
| JP | 2010-107501 A | 5/2010 |
| JP | 2010-197049 A | 9/2010 |
| JP | 2010-197050 A | 9/2010 |
| WO | 2011/045425 A1 | 4/2011 |

OTHER PUBLICATIONS

P. Bahl, V.N. Padmanabhan, "RADAR: An In-building RF-based user location and tracking system", Proc. IEEE INFOCOM 2000 Conference, 2000, vol. 2, Issue c, pp. 775-784.

F. Lassabe, P. Canalda, P. Chatonnay, F. Spies, "A Friis-based calibrated model for WiFi terminals positioning", Proc. Of IEEE in symp. on World of Wireless, Mobile and Multimedia Networks (WoWMoM 2005), Jun. 2005.

T. Roos, P. Myllymaki, H. Tirri, P. Misikangas, J. Sievanen, "A probabilistic approach to WLAN user location estimation", International Journal of Wireless Information Networks, Jul. 2002, vol. 9, No. 3, pp. 155-164.

International Search Report for Application No. PCT/JP2012/004620 dated Oct. 2, 2012.

Extended European Search Report for Application No. 12821781.7-1812/2741009 PCT/JP2012004620 dated Feb. 6, 2015.

* cited by examiner

POSITIONING SERVER DEVICE AND POSITIONING CONTROL METHOD

TECHNICAL FIELD

The present invention relates to a positioning server apparatus and a positioning control method for positioning a client.

BACKGROUND ART

In recent years, research and development on the positioning techniques have been widely conducted aiming to provide a service according to a location of a client. The services provided have been limited to outdoor location based services (map information, weather information, nearby shop information, and others) using the GPS (Global Positioning System). However, there is increased demand on indoor location based services for places such as hospitals, museums, and shopping mall, (floor guides in hospitals, guides on displayed drawings, shop information, and others). In response to this demand, research and development on a positioning technology utilizing wireless technology such as a WLAN (Wireless Local Area Network) as an easy-to-access wireless environment have been actively conducted (see NPL 1 to 4).

Positioning techniques using indoor WLAN include methods for estimating location based on TOA (Time of Arrival), AOA (Angle of Arrival), and RSS (Received Signal Strength) of a radio wave transmitted/received between an access point and a client. Among these techniques, many technical researches have been conducted on the positioning based on RSS because the configuration of an apparatus is generally simpler than apparatuses used for the other methods.

FIG. 1 illustrates a general configuration of a positioning method based on RSS using WLAN. The system illustrated in FIG. 1 includes positioning server SV1 for positioning, access points AP1 to AP3 (hereafter referred to as an AP) connected to positioning server SV1, and client CL1 connected to an AP.

The operation for positioning according to the configuration is illustrated as follows.

An AP transmits beacons including an ID of the AP in a predetermined cycle and at a predetermined transmission power.

Client CL1 measures the RSS of received beacon from the AP (AP1 to AP3) (AP1-RSS to AP3-RSS), and reports, to a connected AP or a positioning server, the measured RSS as a set with the ID of the AP of the transmission source (such as MAC address) with an ID of the station in a predetermined cycle. In the following description, a case in which client CL1 reports to AP will be described, in particular.

When the AP receives the ID of the AP (MAC address and others) and the RSS information from client CL1, the AP notifies positioning server SV1 connected to the AP of the received information in a predetermined cycle.

Positioning server SV1 positions client CL1 using fingerprints held by positioning server SV1 (AP1-fingerprint to AP3-fingerprint) and RSS information (AP1-RSS to AP3-RSS) reported from client CL1. The positioning method will be described later in detail. Subsequently, the positioning result is notified of the AP connected to client CL1, with the client ID.

When the client ID and the positioning result are received from positioning server SV1, the AP notifies client CL1 of the positioning result of client CL1 connected to the AP. When multiple clients are connected, the series of process described above will be performed for each client. Note that, positioning server SV1 may directly notify client CL1 of the positioning result.

Subsequently, the positioning method using the fingerprint of the RSS will be described in detail. With the positioning method, the processes in an offline phase and an online phase are generally performed. The process in the offline phase is performed in preparation for the positioning, and a map including the RSS which simulates a propagation environment in a positioning range beforehand (hereafter referred to as fingerprint) is created. More specifically, RSS data measured by an operator at positioning candidate points (also referred to as grid points) is set as a reference RSS of the positioning candidate points in the fingerprint. Alternatively, the RSS data at each grid point calculated by using a distance attenuation formula such as Friis equation represented as Equation 1 as the reference RSS of the positioning candidate point of the fingerprint. Upon calculation, the parameters used in the equation are set as representative values, for example.

Using the fingerprint created as described above, a positioning section in positioning server SV1 can calculate an estimated value of the RSS when a signal transmitted from the AP is received by a positioning candidate point by specifying the AP and a positioning candidate point. More specifically, the estimated value of RSS can be extracted from the fingerprint as reference RSS. The fingerprints are created for respective APs (AP1 to AP3) connected to positioning server SV1 (AP1-fingerprint to AP3-fingerprint) (see FIG. 1).

$$RSS = P_t + G_t + G_r + a + c \log 10(d) \quad \text{(Equation 1)}$$

$P_t$: Transmission power, $G_t$: Transmission antenna gain, $G_r$: Reception antenna gain, a: Coefficient dependent on frequency used, c: Path loss coefficient, d: Transmission/reception distance In the process in the online phase, client CL1 is actually positioned, and the fingerprints are updated to follow the actual changing propagation environment.

Various methods have been presented as specific positioning methods. However, as illustrated in Equation 2, many of them are based on estimation using a positioning candidate point which makes a square error of the value of the fingerprint and the RSS to minimum. More specifically, the method used as a base includes calculating the square error between the reference RSS extracted from the fingerprint and the measured RSS and estimating a positioning candidate point which makes the square error minimum as a positioned location.

(Equation 2)

$$\text{Positioned location estimated\_i} = \min_i \left\{ \sum_{k}^{AP\ count} |RSS_{ref}(k, i) - RSS_{meas}(k)|^2 \right\} \quad [2]$$

$RSS_{ref}(k, i)$: Reference RSS of AP#k at grid index i
$RSS_{meas}(k)$: Measured RSS of AP#k Here, k denotes an index for identifying the AP, i denotes a grid index for identifying a positioning candidate point, and AP#k denotes an access point at index k. The right-hand side of Equation 2 represents a value of grid index i having a minimum value in curly brackets.

There are various methods for updating fingerprints. The following method is the simplest method. More specifically, as illustrated in Equation 3, the measured RSS at the positioned location measured for client CL1 is considered as RSS actually measured reflecting the actual propagation environment, and the reference RSS of the positioning point in the fingerprint is updated. Alternatively, the coefficient for determining the fingerprint (for example, path loss coefficients) is recalculated, and the value of the recalculated path loss coefficient is reflected on other positioning candidate points in the fingerprint, and an estimated value of the signal reception strength at the positioning candidate point is calculated. Subsequently, the recalculated value is registered to the fingerprint as the reference RSS updated. Stated differently, the reference RSS at the positioning candidate point included in the fingerprint is updated based on the RSS actually measured by client CL1 at one position.

(Equation 3)

$$RSS_{ref}(k, \text{estimated\_i}) = RSS_{meas}(k) \quad [3]$$
$$c_{updated} = \frac{RSS_{ref}(k, \text{estimated\_i}) - P_t - G_r - G_t - \alpha}{\log 10(d_{estimated})}$$
$$\text{updated\_RSS}_{ref}(k, i) = P_t + G_r + G_t + \alpha + c_{updated} \log 10(d_{k \leftrightarrow i})$$

$RSS_{ref}$(AP index, grid index): Reference RSS
$RSS_{meas}$(AP index): Measured RSS
$c_{updated}$: Updated path loss coefficient
$d_{estimated}$: Estimated grid location and distance between APs
updated_$RSS_{ref}$: Updated reference RSS With a positioning method using the fingerprint described above, positioning with accuracy of an error of approximately few meters may be performed within a fixed positioning range (for example, a hospital, a museum, and a shopping mall).

CITATION LIST

Non-Patent Literature

NPL 1
"Wi-Fi Location-Based Services—Design and Deployment Considerations", tech. rep., Cisco Systems, 2006, URL: https://learningnetwork.cisco.com/docs/DOC-3418
NPL 2
P. Bahl, V. N. Padmanabhan, "RADAR: An In-building RF-based user location and tracking system", Proc. IEEE INFOCOM 2000 Conference, 2000, Volume 2, Issue c, pp. 775-784
NPL 3
F. Lassabe, P. Canalda, P. Chatonnay, F. Spies, "A Friis-based calibrated model for WiFi terminals positioning", Proc. of IEEE in symp. on World of Wireless, Mobile and Multimedia Networks (WoWMoM 2005), June 2005
NPL 4
T. Roos, P. Myllymaki, H. Tirri, P. Misikangas, J. Sievanen, "A probabilistic approach to WLAN user location estimation", International Journal of Wireless Information Networks, July 2002, Volume 9, Number 3, pp. 155-164

SUMMARY OF INVENTION

Technical Problem

In the positioning system described above, the positioning range in the positioning server and the range where the client to be positioned by the positioning server can move (a range in which the client may be present) are set to substantially coincide with each other. Data representing the reference RSS in the positioning range is stored in the fingerprint held by the positioning server.

However, when the client is present at a location outside of the positioning range of the positioning server, the positioning of the client present outside of the positioning range may be performed by the positioning server. In this case, the fingerprint in the positioning server does not correspond to the location of the client outside of the positioning range, and thus the positioning result includes a large error. Furthermore, the fingerprint is subsequently updated based on the positioning result including the large error, and thus a large error is included in the entire fingerprint. As a result, there is a problem that the positioning accuracy afterward is significantly degraded.

As an example, a positioning system is in a facility for mobile cars such as train or bus (inside train car or bus car, or inside station/platform or terminal). In the mobile car facility, the setting is adjusted such that the positioning for different positioning is performed by positioning server SV1 and SV2, as illustrated in FIG. 2A. For example, positioning server SV1 installed on a train car performs positioning within the train car as a positioning range, and positioning server SV2 in the platform performs positioning within the platform as a positioning range. Accordingly, in positioning server SV1 in a train car, the fingerprint having the region within the train car as the positioning range is held and used. In positioning server SV2 in the platform, a fingerprint including the region in the platform is held and used. Note that, in FIGS. 2A and 2B, illustration of APs connected to positioning servers SV1 and SV2 are omitted, and only one AP is illustrated as a representative of the APs connected to positioning servers SV1 and SV2, respectively.

As illustrated in FIG. 2A, when a train car is running, appropriate positioning can be performed with the configuration described above. However, as illustrated in FIG. 2B, when the train car stops at a platform, and when passengers are getting on or off of the train car, the following problem arises. More specifically, when the passengers on the train car move to the platform, there will be a time lag (delay) in switching the connection destination of client CL1 of the passenger from AP (AP1) in the train car to AP (AP2) on the platform. In addition, during the time lag, positioning server SV1 very occasionally perform the positioning for client CL1 of the passenger. More specifically, client CL1 of the passenger who got off the train reports information on the RSS to positioning server SV1 in the train car through AP from the platform, and positioning server SV1 performs the positioning based on RSS information.

In this case, the fingerprint held by positioning server SV1 in the train car only supports the positioning range in the train car. Consequently, accurate positioning for client CL1 outside of the positioning range (that is, outside of the region of the train car) cannot be performed (see FIG. 3A). More specifically, positioning based on Equation 2 is performed. Accordingly, the grid index is limited to the positioning range within the train car. More specifically, although client CL3 in the train car (at the location indicated by a sign ○) is accurately positioned, and the positioning result is represented as location b (the location at the star sign) (that is, the star sign coincides with ○). However, the positioning result of client CL1 who got off the train and is on the platform (the location at ○) is significantly displaced, and client CL1 is positioned as being in location a in the train car (the location at the star sign) (that is, the star sign is significantly displaced from ○).

Subsequently, positioning server SV1 in the train car updates the fingerprint based on the largely displaced positioning result, as illustrated in Equation 3. As a result, the fingerprint also includes a significant error. When the fingerprint includes a significant error, the accuracy of the positioning is significantly degraded when positioning the train car afterward using the fingerprint, as illustrated in FIG. 3B. For example, the positioning result of client CL3 (the location at ○) in the train car is significantly displaced from location b (the location at the star sign).

The same problem may arise in positioning server SV2 on the platform (see FIG. 2). More specifically, when client CL2 connected to AP on the platform (AP2) moves from the platform to the train car, there is a time lag (delay) before the connection is switched to AP (AP1) in the train car by the handover. During the delay, the information on RSS measured in the train car (that is, outside of the platform region) may be sent to positioning server SV2 on the platform. In this case, in the same manner as positioning server SV1 in the train car described above, positioning with error is performed by positioning server SV2 on the platform, and the fingerprint is updated based on the positioning result containing error. Consequently, the accuracy of positioning for other clients on the platform is degraded.

It is an object of the present invention to provide a positioning server apparatus and a positioning control method capable of avoiding degradation in the positioning accuracy even when a client to be positioned is present at a location outside of the normal positioning range as described above.

Solution to Problem

The positioning server apparatus according to the present invention includes: an input section that inputs measurement information of a radio wave transmitted between an access point and a client; a radio wave map managing section (for example fixed fingerprint managing section 11 and extended fingerprint managing section 12 to be hereinafter described) that manages radio wave map data (for example a fingerprint) representing a correspondence relation between the measurement information and a spatial location; and a positioning section that measures a location of the client based on the measurement information and the radio wave map data, in which the radio wave map managing section manages first map data and second map data as the radio wave map data, the first map data related to a fixed positioning range where there is a possibility that the client to be positioned is present during normal operation, and the second map data related to an extended positioning range where there is possibility that the client to be positioned is present under a specific condition (for example a specific period of time or a specific condition).

The positioning control method according to the present invention includes: inputting measurement information of a radio wave transmitted between an access point and a client; measuring a location of the client based on the measurement information and radio wave map data representing a correspondence relation between the measurement information and a spatial location; and updating the radio wave map data based on the measurement information and a positioning result of the client, in which the radio wave map data includes first map data related to a fixed positioning range where there is a possibility that the client to be positioned is present during normal operation and second map data related to an extended positioning range where there is possibility that the client to be positioned is present under a specific condition (for example a specific period of time or a specific condition).

Advantageous Effects of Invention

According to the present invention, even when the client is present in a range outside of the normal positioning range (extended positioning range); no positioning containing a significant error is performed. Furthermore, the radio wave map data is not updated erroneously due to the positioning result including a significant error. As a result, the degradation on the accuracy in positioning is avoided.

DESCRIPTION OF EMBODIMENTS

Embodiments of the present invention will be described as follows with reference to the drawings.

Embodiment 1

Figure 1:
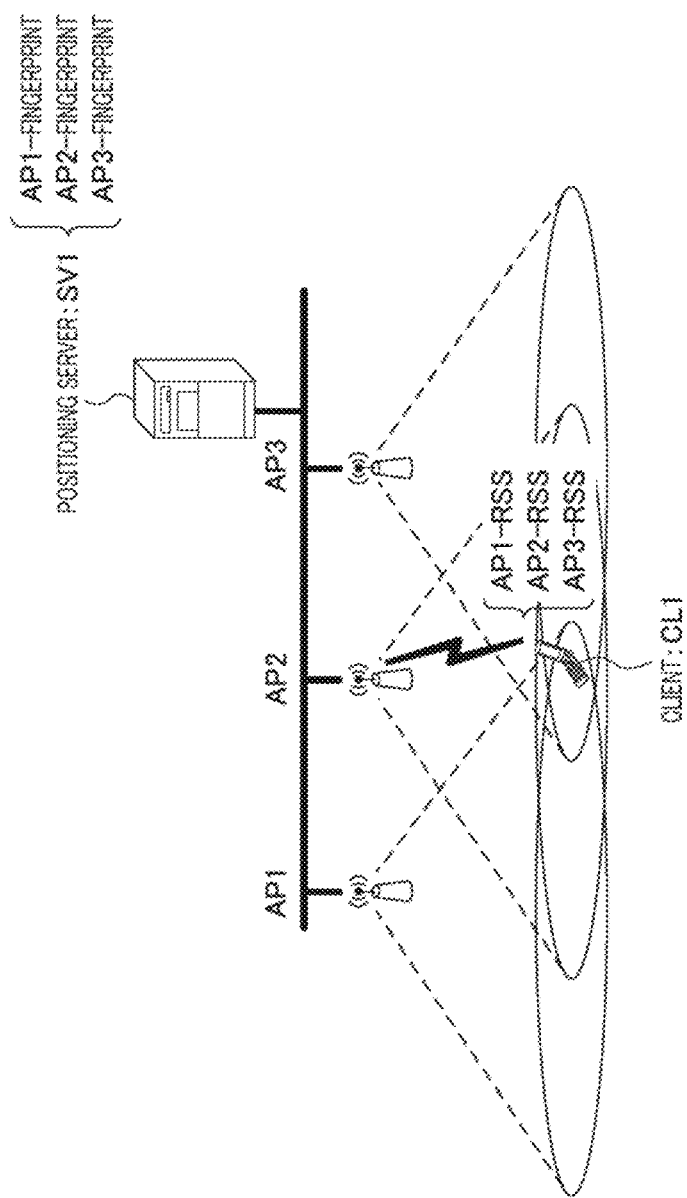
FIG. 1 illustrates a general configuration of a positioning method based on RSS using WLAN.
Figure 2A:
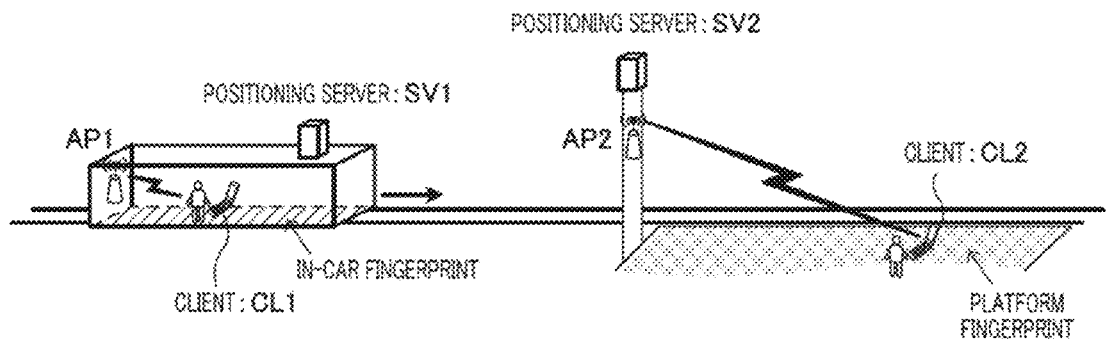
FIGS. 2A and 2B illustrate a conventional example of a positioning range in a railway facility.
Figure 2B:
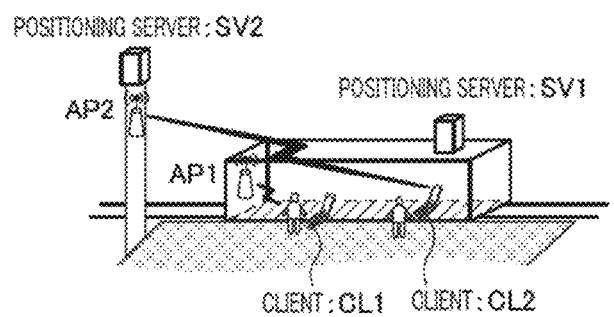
Figure 3A:
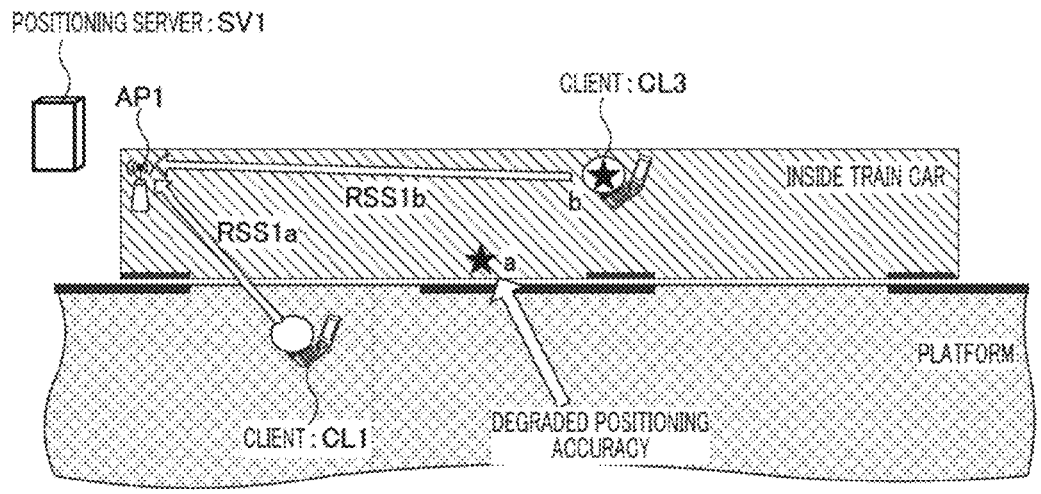
FIGS. 3A and 3B illustrate an example of process that degrades positioning accuracy in the conventional example.
Figure 3B:
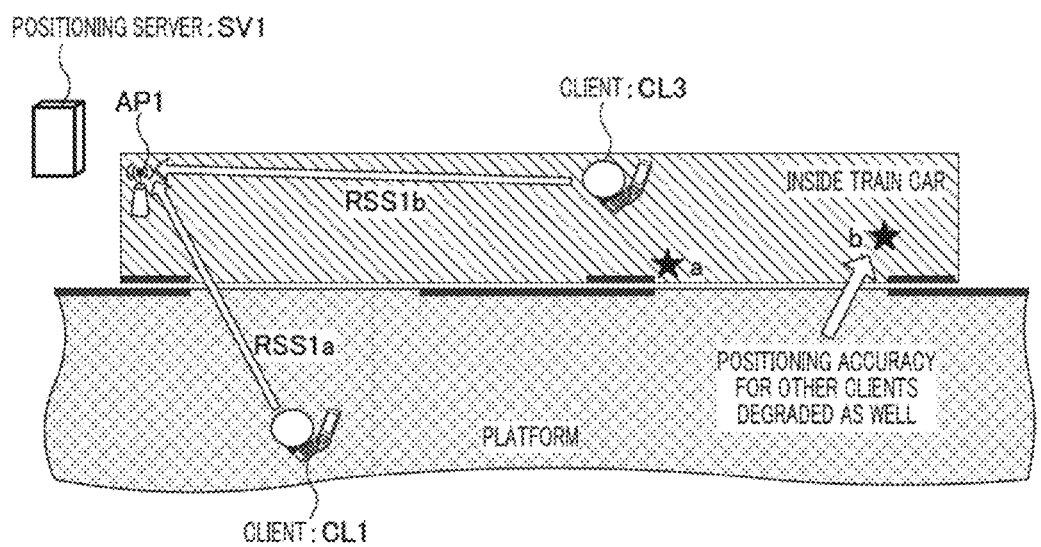
Figure 4:
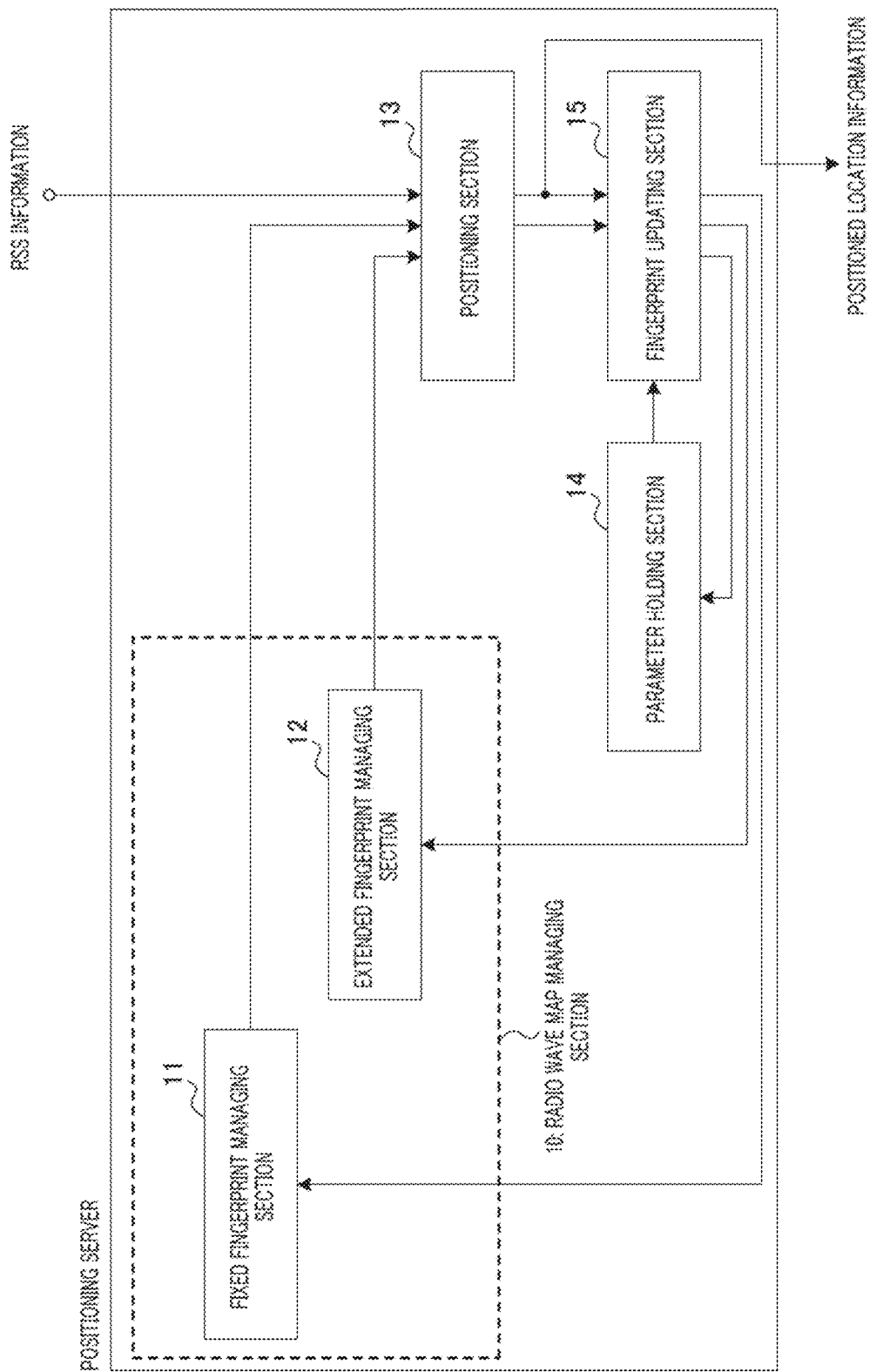
FIG. 4 is a block diagram illustrating a configuration of a positioning server according to Embodiment 1 of the present invention.
Figure 5:
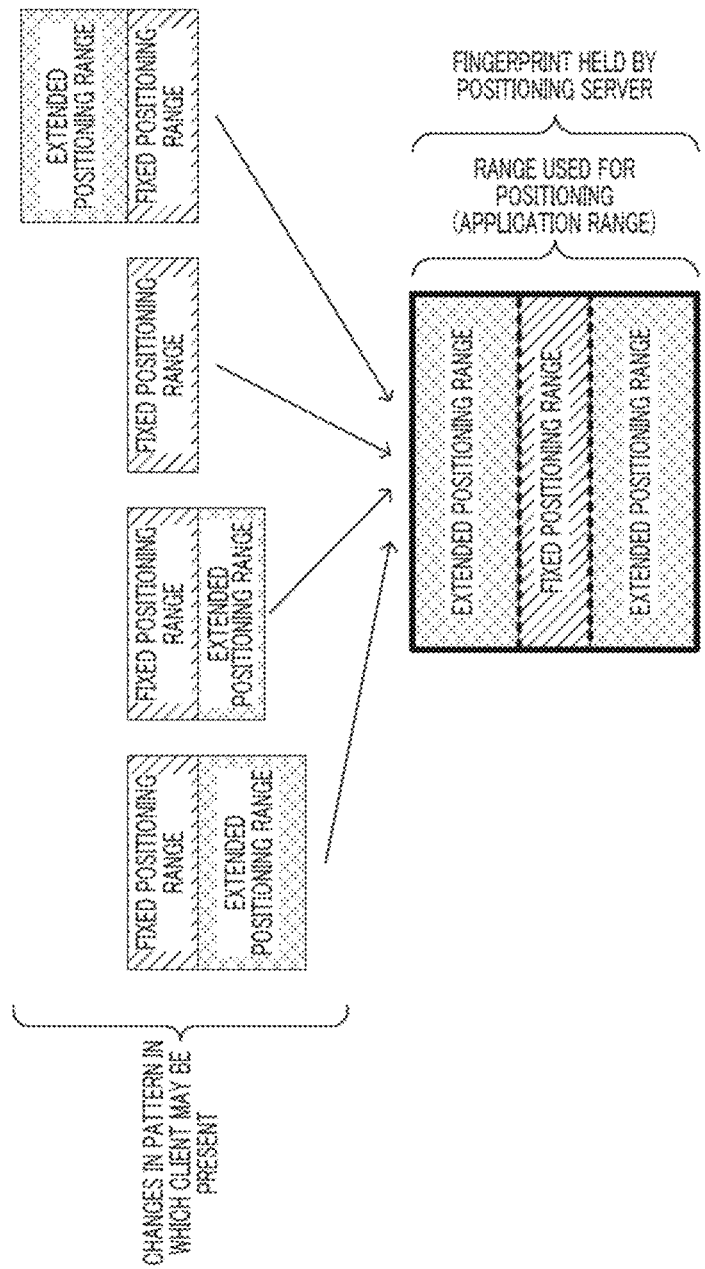
FIG. 5 is a diagram illustrating the correspondence relation between changes in pattern in a range in which a client to be positioned may be present and fingerprints.

FIG. 4 is a block diagram illustrating a configuration of a positioning server according to Embodiment 1 of the present invention. FIG. 5 illustrates correspondence relation between variations in a range where there is possibility that a client to be positioned is present and a fingerprint.

The positioning server according to Embodiment 1 includes radio wave map managing section 10, fixed fingerprint managing section 11, extended fingerprint managing section 12, positioning section 13, parameter holding section 14, and fingerprint updating section 15.

Radio wave map managing section 10 manages radio wave map data (for example, fingerprint) representing measuring information of radio wave transmitted between access point AP and client CL (hereafter RSS is used as a representative example) and a spatial location. In Embodiment 1, radio wave map managing section 10 is composed of fixed fingerprint managing section 11 and extended fingerprint managing section 12.

Fixed fingerprint managing section 11 holds (stores and manages) a fingerprint (hereafter referred to as a fixed fingerprint) in the fixed positioning range set as a spatial range where a client to be positioned may be present in normal operation (see FIG. 5). The fixed fingerprint is created and held for each of access points APs (also referred to as base stations, access nodes) connected to the positioning server. The fixed fingerprint is read by fixed fingerprint managing section 11 when necessary for the positioning, and is provided to positioning section 13. In addition, fixed fingerprint managing section 11 keeps receiving input of updated data from fingerprint updating section 15, and an entire or part of the fixed fingerprint is replaced for an update.

Note that, fixed fingerprint managing section 11 may be configured such that the fixed fingerprint is held by a communication network or another storage apparatus or another processing apparatus such as another positioning server on a communication link, and that the fixed fingerprint may be read via a communication network or a communication link. With this configuration, the positioning system according to Embodiment 1 can reduce the size of hardware for the positioning server. In addition, in the positioning system according to Embodiment 1, when the fingerprint of the same AP is shared by a plurality of positioning servers, the processing load for updating the fingerprint per one positioning server can be reduced.

Extended fingerprint managing section 12 holds (stores and manages) the fingerprint of extended positioning range (see FIG. 5) set as a spatial range where a client to be positioned may be present under a specific condition such as a specific period or a state. In the following description, the fingerprint in the extended positioning range is referred to as an extended fingerprint.

The extended positioning range is added, as extension, to the fixed positioning range to which a fixed fingerprint held by fixed fingerprint managing section 11. For example, a range overlapping fixed positioning range held by another positioning server is determined as an extended positioning range. More specifically, an extended positioning range is a range set such that positioning for a client present in the fixed positioning range of another positioning server is performed. Accordingly, the client present in the extended positioning range is usually to be measured by another positioning server, and conditions such as a period or a state to be positioned by the positioning server are limited.

The extended fingerprint is created and held for each AP connected to the positioning server. The extended fingerprint is read by extended fingerprint managing section 12 when necessary for the positioning, and is provided to positioning section 13. In addition, extended fingerprint managing section 12 inputs updated data sequentially updated by fingerprint updating section 15, and the entire or part of the extended fingerprint data is replaced for an update.

Note that, extended fingerprint managing section 12 may hold an extended fingerprint on the communication network, another storage apparatus on the communication link, or a processing apparatus such as another positioning server. Subsequently, extended fingerprint managing section 12 may configure the extended fingerprint to be readable/writable over a communication network or a communication link. With this configuration, the positioning system according to Embodiment 1 can reduce the size of hardware for the positioning server, and when a fingerprint of the same AP is shared by a plurality of positioning servers, the processing load for updating the fingerprint for one positioning server can be reduced.

Positioning section 13 positions a client using RSS information from the client provided from an input terminal through a subordinate AP, fixed fingerprint obtained from fixed fingerprint managing section 11, and an extended fingerprint obtained from extended fingerprint managing section 12. Here, the subordinate AP refers to at least one AP whose fingerprint is held by the positioning server, which transmits a signal to a client for positioning the client connected to the positioning server (for example, beacon). In addition, positioning section 13 provides the positioning result to an output terminal, and provides location information to client through AP, for example.

Parameter holding section 14 holds and manages parameters such as the frequency used by the subordinate AP, the setting location of the subordinate AP, a transmission power value of the subordinate AP, an antenna gain of the subordinate AP, path loss coefficient used for calculating a fingerprint for the subordinate AP, and an antenna gain of the client.

Fingerprint updating section 15 estimates or derives parameters such as the path loss coefficients of the AP and the antenna gain of the client, using the following three items of information: 1 RSS information from a client used by positioning section 13; 2 The result of positioning the client obtained by positioning section 13; and 3 The value of a parameter held by parameter holding section 14. Fingerprint updating section 15 updates the information managed by parameter holding section 14. Furthermore, fingerprint updating section 15 updates the fingerprint of AP using the updated parameter. Furthermore, fingerprint updating section 15 outputs a part corresponding to the fixed positioning range of the updated fingerprint to fixed fingerprint managing section 11, and a part corresponding to an extended positioning range to extended fingerprint managing section 12. Fixed fingerprint managing section 11 and extended fingerprint managing section 12 update data of fingerprint held therein.

Fingerprint updating section 15 mainly estimates or derives parameters in the fixed positioning range such as path loss coefficients in the fixed positioning range, using the positioning result of the client in the fixed positioning range, and updates the parameters. Usually, the correlation between parameters determining the fingerprint is low between the fixed positioning range and the extended positioning range, since the condition such as a congestion degree of people is usually different. However, in a specific period when the client can move from the fixed positioning range to the extended positioning range (for example, a period when doors of a train car are open), the correlation of parameter for determining the fingerprints increases between the fixed positioning range and the extended positioning range in relation to the condition of the congestion degree of people. In consideration of this phenomenon, fingerprint updating section 15 estimates or derives the parameters in the fixed positioning range, updates the fixed fingerprint using the parameters such as updated path loss coefficients, and updates the extended fingerprint in the same manner.

Note that, fingerprint updating section 15 may update an extended fingerprint in a frequency smaller than the update frequency of the fixed fingerprint. In the extended positioning range, conditions such as time or status of clients to be measured can exist are limited. Accordingly, especially when the client does not match the condition present in the extended positioning range, fingerprint updating section 15 can reduce the frequency of updating the extended fingerprint. Even if the update frequency is reduced, the effect on the positioning accuracy is suppressed. Accordingly, fingerprint updating section 15 can reduce the processing load while suppressing the effect on the positioning accuracy.

The operation of the positioning server corresponding to Embodiment will be described including the operation of the APs and the clients.

The AP connected to the positioning server transmits a beacon signal or a polling packet to a subordinate client. The AP may transmit a beacon signal or a polling packet in a predetermined frequency, or with specific timing. Alternatively, AP may be transmitted at a predetermined transmission power. In addition, AP may transmit a beacon signal or a polling packet including an ID of the station (for example, one or a combination of a plurality of SSID, MAC address, identification information specific for positioning and others) may be transmitted. With this, the client can accurately identify the AP.

Note that, the beacon signal or the polling packet may be transmitted by a positioning server. The beacon signal or the polling packet transmitted by the positioning server is distributed to a client via a subordinate AP. This configuration allows the positioning server to specify a client to be positioned, when positioning the specific client. More specifically, since the system can be constructed using a universal AP, flexibility or freedom of the positioning system improves (When AP transmits a beacon signal, it is necessary for the positioning server to specify a client to be positioned to AP, which requires a protocol between AP and the positioning server. Accordingly, the freedom is reduced when constructing system using a specific AP is restrictive). In addition, the beacon signal or a polling packet may be transmitted to a specific client by unicast, to a specific group of clients by multicast, or to all of the subordinate clients by broadcast.

In the following description, a case in which a beacon signal is transmitted from a subordinate AP will be described.

The client measures RSS of the beacon signal from the AP received, and transmits, to a connected AP or a positioning server, RSS information including the received ID of AP (identification information: MAC address and others) and measured RSS as a set. Here, the client may add an ID of the station (for example, an IP address, a MAC address, or identification information specialized for positioning) with RSS information and send the information. By adding the ID of the client, the positioning server can identify the client as a specific terminal.

After the client transmits RSS information to AP, AP transfers RSS information to a positioning server. Here, AP may add an ID of a client to RSS information and send the information. With this, even when the client does not add the ID to RSS information, the positioning server can accurately identify the clients.

The positioning server holds a fixed fingerprint of a subordinate AP in fixed fingerprint managing section 11, and holds an extended fingerprint of a subordinate AP in extended fingerprint managing section 12. The positioning server also holds parameters such as a path loss coefficient, an antenna gain in the subordinate AP, an estimated antenna gain of the client, and others in parameter holding section 14. Subsequently, the positioning server receives, from an input terminal, an input of ID of an AP (such as MAC address) and RSS to be reported from the client through the subordinate AP (hereafter collectively referred to as RSS information). In response to the input, positioning section 13 receives a fixed fingerprint and an extended fingerprint related to AP reported from the client (to be positioned) from fixed fingerprint managing section 11 and extended fingerprint managing section 12. Subsequently, positioning section 13 calculates a positioned location using the RSS information related to AP reported by the client and Equation 2 described above, for example. More specifically, positioning section 13 calculates a grid point where a square error of reference RSS of the fingerprint and the measured RSS as the positioned location becomes its minimum as the positioned location. Positioning section 13 outputs the calculated positioned location and the RSS information with regard to AP to fingerprint updating section 15. Positioning section 13 outputs the positioned location and the client ID of the client to the output terminal.

Upon receiving an input of positioned location and RSS information related to AP measured and reported by the client and used for positioning, from positioning section 13, fingerprint updating section 15 reads the parameter to be held from parameter holding section 14. Using the parameters, fingerprint updating section 15 estimates and updates parameters regarding AP, using Equation 3 described above, for example. Subsequently, fingerprint updating section 15 updates a fingerprint of an AP, using the updated parameters.

It is assumed that actual propagation environments of the fixed positioning range and the extended positioning range are correlated. Accordingly, fingerprint updating section 15 updates the extended fingerprint using the parameter values, even when the values of the parameters are updated based on RSS information in the fixed positioning range.

Furthermore, fingerprint updating section 15 outputs a part corresponding to the fixed positioning range of the updated fingerprint to fixed fingerprint managing section 11, and a part corresponding to an extended positioning range to extended fingerprint managing section 12. The updated parameter is output to parameter holding section 14.

Upon receiving a message including a client ID and a positioning result from the positioning server, AP transmits (transfers) the positioning result to the client. Here, the positioning server may include a type of fingerprint used for positioning in the message, and notify the client of the type. For example, the positioning server may notify the identifier for identifying the fingerprint. The identifier represents information such as whether or not positioning is performed on the fixed positioning range or the extended positioning range, that is, whether the fixed fingerprint or the extended fingerprint is used (more specifically, which extended fingerprint is used). With this, when the positioning is performed using the extended fingerprint, the client can determine and start switching to an appropriate server (handover) with appropriate timing.

Note that, fixed fingerprint managing section 11 may hold data of RSS measured by another measuring apparatus at a grid point in the fixed positioning range held by AP in advance as initial data of the fixed positioning range held. As described above, by holding the initial data based on the actual measurement, the positioning server can start positioning without waiting for a match of the fingerprint to the actual environment.

Alternatively, fixed fingerprint managing section 11 may hold initial data calculating RSS at a grid point in the fixed positioning range as the initial data for the fixed positioning range. The calculation of RSS may be performed by estimating a path loss coefficient by actual measurement and others, and by using a distance attenuation equation known as Friis equation (Equation 1), for example.

In addition, extended fingerprint managing section 12 can hold data of RSS actually measured at the grid point of the extended positioning range held by AP in advance as initial data of the extended positioning range held. As described above, by holding the initial data based on the actual measurement, the positioning server can start positioning without waiting for a match of the fingerprint to the actual environment.

Alternatively, extended fingerprint managing section 12 may hold data of RSS corresponding to the grid point of the extended positioning range of the AP calculated, as initial data of the extended positioning range. The calculation of the RSS may be performed using a distance attenuation equation such as Friis equation (Equation 1) based on RSS information in the fixed positioning range of the AP obtained in advance, path loss coefficient, structure information in the fixed positioning range (for example, location of a reflection object such as wall), and installed position of AP.

Here, suppose a case in which the positioning server is installed on a train car and a region in the train car is set as the fixed positioning range, and a region outside of the train car is set as the extended positioning range. In this case, there is no correlation between actual propagation environments of the fixed positioning range and the extended positioning range when the first train leaves in the morning, for example. Even when the first train leaves in the morning, the states on the platform and inside the train car may be identical or completely different depending on stations. The states on the platform and inside the train car are identical when the clients on the platform are sparse, but are completely different when the platform is crowded. Accordingly, in consideration of the states, the positioning system according to Embodiment 1 may generate and hold a database of statistical information on congestion for each station or each time period of the first train in the morning. Subsequently, fixed fingerprint managing section 11 may hold initial data of the fingerprint in the train car determined based on the congestion statistic information described above.

Figure 6A:
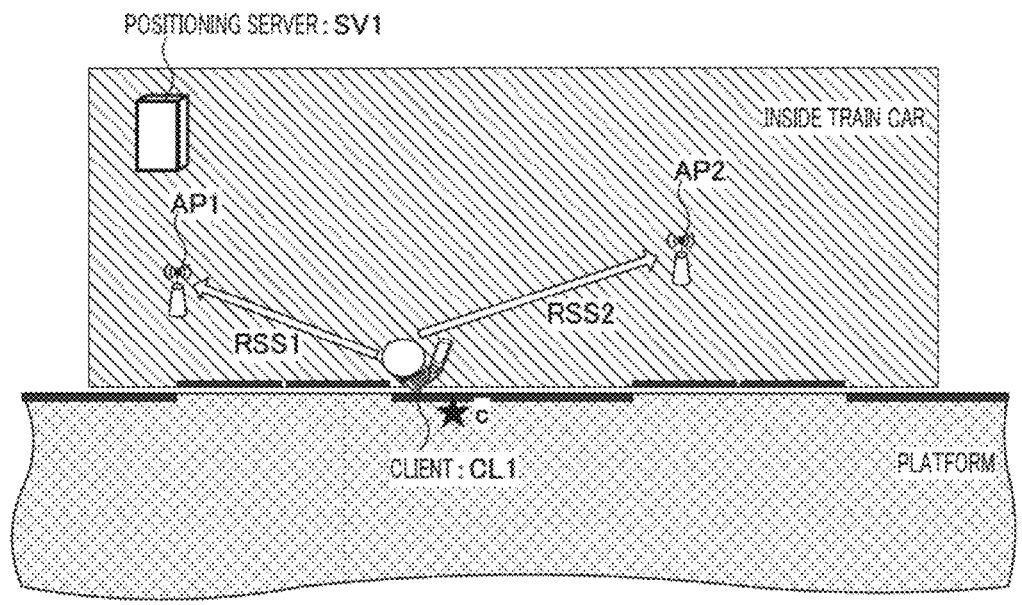
FIGS. 6A and 6B illustrate an effect of fingerprint in an extended positioning range.
Figure 6B:
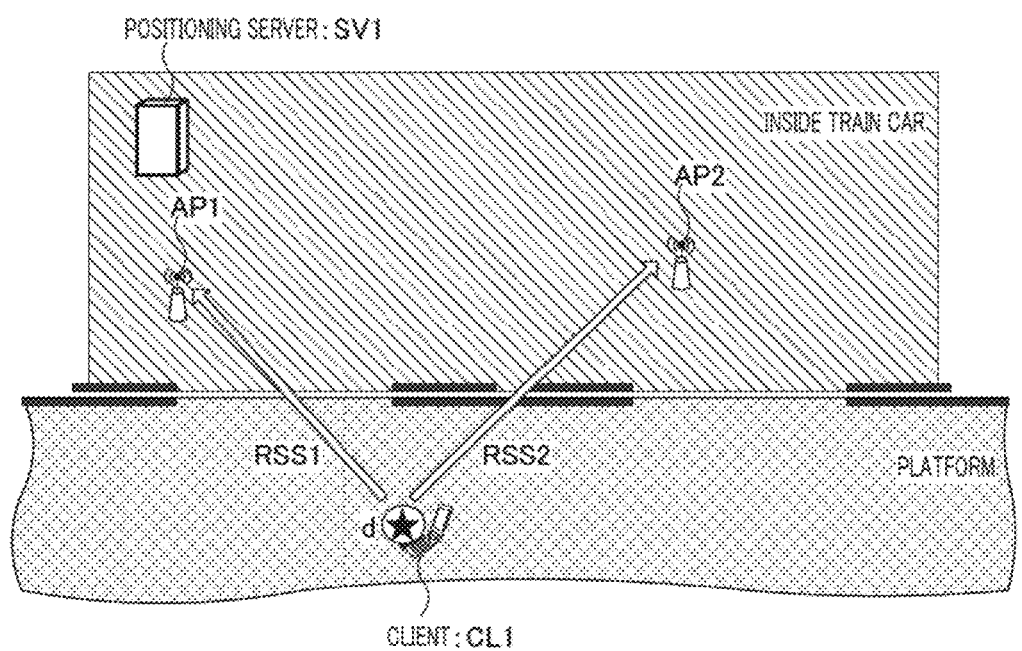

FIGS. 6A and 6B are diagrams illustrating the effects of extended fingerprints.

According to the positioning server according to Embodiment 1, fixed fingerprint managing section 11 holds fingerprints in the fixed positioning range. Furthermore, extended fingerprint managing section 12 holds extended fingerprints covering an entire positioning range (extended positioning range) where clients to be positioned can move outside of the fixed positioning range. In addition, fingerprint updating section 15 successively updates the fingerprints to adjust to a propagation environment at a predetermined point in time. Accordingly, the positioning server according to Embodiment 1 reduces degradation by a move of a client to be positioned to outside of the positioning range.

For example, as illustrated in FIG. 6B, assume a case in which positioning server SV1 according to Embodiment 1 is installed on a train car and the fixed positioning range is set only in the train car. In this case, when a door of the train car opens and client CL1 moves to the platform (to a location illustrates as o), subordinate APs (AP1, AP2) installed on the train car may transmit a signal to client CL1 on the platform. The signal is transmitted in a period before client CL completes a handover from APs (AP1, AP2) in a train car to AP on the platform. Subsequently, when the information of reception signal RSS1 and RSS2 of the signal is reported from client CL1, positioning server SV1 performs the positioning process. In this case, a spatial range to be positioned is extended to a platform by an extended fingerprint. Accordingly, positioning server SV1 may position location d (the location at the star sign) of client CL1 highly accurately (the locations of ○ and a star sign coincide with each other). Accordingly, it is possible to avoid an erroneous update on a fingerprint including error by fingerprint updating section 15 afterward.

Alternatively, suppose a time period when a door of the train car is closed when the train stops at the platform, as illustrated in FIG. 6A. In this time period, positioning server SV1 positions the client using, not only a fixed fingerprint, but also an extended fingerprint using a range outside of the door where client CL1 is not possibly present (extended positioning range). Accordingly, possibility that positioning section 13 calculates a positioning result of client CL1 as a location outside of the extended positioning range, which is outside of a door cannot be denied. However, in this case, as illustrated in FIG. 6A, client CL1 is actually in the train car. Accordingly, positioning server SV1 performs the positioning using the fixed fingerprint, even if the extended fingerprint is available. Positioning server SV1 can suppress an error from an actual location of client CL1 (the location at ○) and the positioned location and positioning location c (the location at the star sign) (the displacement between the location of ○ and the location of the star sign can be suppressed to an error at a level equivalent to an error when the positioning is performed only with the fixed fingerprint). Accordingly, the positioning accuracy is not degraded. Furthermore, the positioning result does not include a significant error. Thus, fingerprint updating section 15 does not update the fingerprint including a significant error.

Embodiment 2

Figure 7:
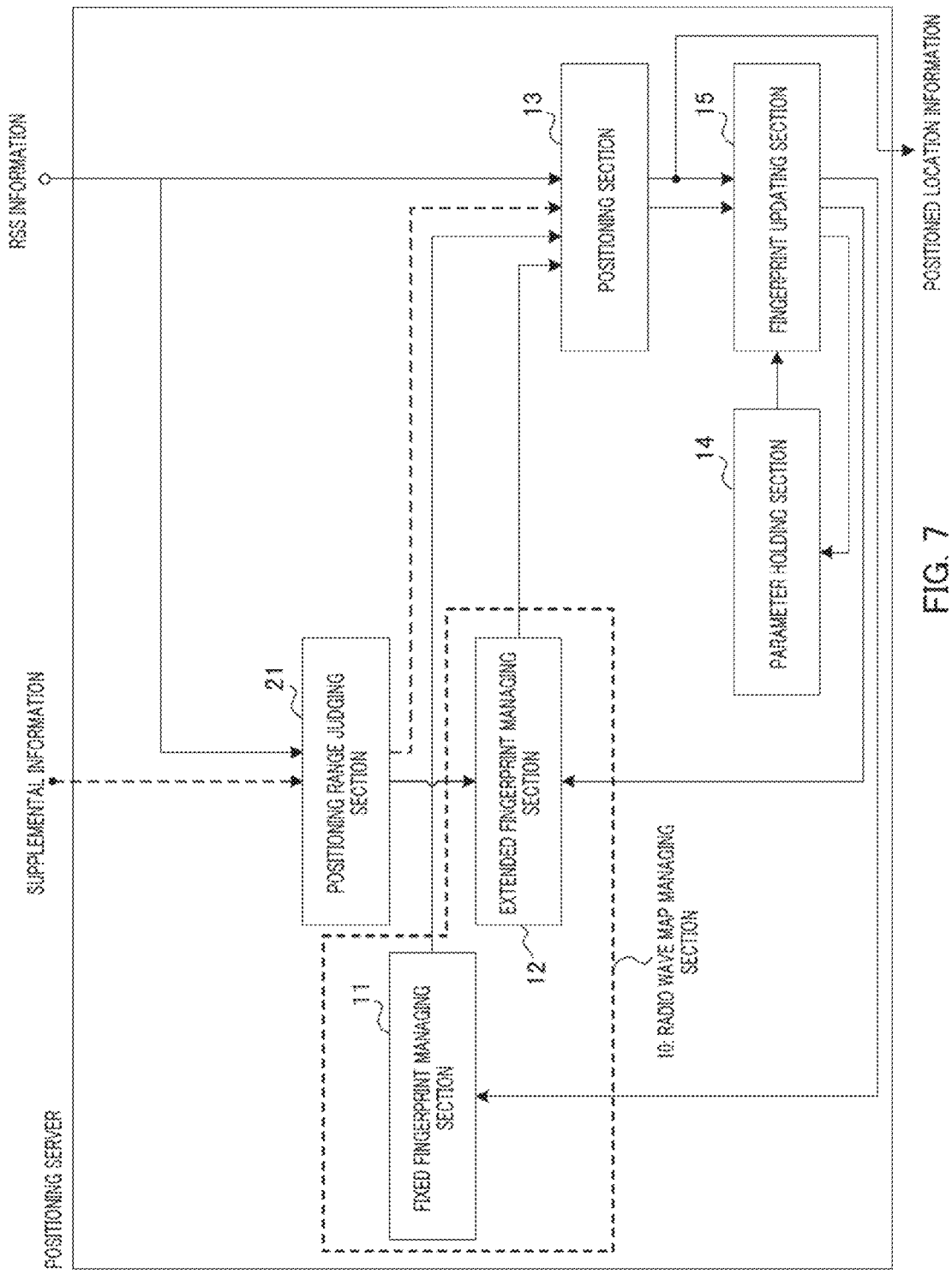
FIG. 7 is a block diagram illustrating a configuration of a positioning server according to Embodiment 2 of the present invention.

FIG. 7 is a block diagram illustrating a configuration of a positioning server according to Embodiment 2 of the present invention. The positioning server according to Embodiment 2 includes positioning range judging section 21 in addition to the configuration according to Embodiment 1. The components identical to those in Embodiment 1 are assigned with the same reference numerals, and the detailed description for these components will be omitted.

Positioning range judging section 21 determines a part to be included in the positioning range and a part not to be included at the point in time. More specifically, a part where there is possibility that the client to be positioned is present and a part where there is no possibility or barely possible may exist, depending on the point in time and condition. The judgment aims for including the former in the positioning range, and excluding the latter from the positioning range. The fixed positioning range is always included in the positioning range since clients to be positioned usually are present therein.

Note that, under specific conditions, positioning range judging section 21 may exclude the region from the region to be positioned even if the region is in the fixed positioning region. For example, when it is acknowledged that all passengers got off the train at the last station, positioning range judging section 21 may determine that only the extended positioning range is to be positioned, excluding the fixed positioning range, and positioning section 13 may perform the positioning. With this, positioning section 13 can reduce the entire complexity or the processing load by suppressing the positioning process on a region where the client is not present.

In addition, even under a specific condition such as a period when the client to be positioned cannot be in the extended positioning range (for example, when doors of a train car is closed, or when the train car is running) or a state (for example, in a state where doors of a train car is closed, or in a state where the train car is running), positioning range judging section 21 may include the extended positioning range in the positioning range. Even in this case, there is no inconvenience as described in Embodiment 1. Accordingly, when changing a part to be included and a part not to be included in the positioning range in the extended positioning range, positioning range judging section 21 may strictly determine a condition or a period for excluding a part from the positioning range, and generously determine a condition or period for including a part in the positioning range. With this, the positioning server can prevent a significant positioning error that the client to be positioned is present outside of the positioning range.

Based on RSS information transmitted from the client via a subordinate AP, positioning range judging section 21 determines, in the extended positioning range, a part to be included in and a part excluded from the positioning range. The specific example of the determining method will be described later in Embodiment 3 and Embodiment 4 in detail. Alternatively, positioning range judging section 21 may input supplemental information from outside, and determine the parts described above based on the supplemental information. The supplemental information may be, for example, information for opening/closing a door where the client can move from the fixed positioning range to the extended positioning range, information representing time for opening and closing the door, or a door that opens when there are a plurality of doors.

Alternatively, when the positioning server is installed on a train car, line-in instruction information to be transmitted from the station to the management server of the train car, a signal for switching to an in-car guidance display corresponding to the line-in instruction, a signal for switching a signal immediately before the station (a signal for switching a red signal to a blue signal), and operation schedule information of the train car may be included in the supplemental information. Positioning range judging section 21 calculates a period or a range in which there is no possibility that a client gets off the fixed positioning range (inside the train car) to the extended positioning range (platform), by deriving a location of a door opening and closing based on the information. Positioning range judging section 21 excludes the range from a positioning range at that point in time. For example, when receiving an input of the operation schedule information of the train car, positioning range judging section 21 determines, as only the fixed positioning range, a positioning range in a period when the train car is traveling from station A to station B, with reference to the current time. At the same time, positioning range judging section 21 can change the positioning range for one minute when the train car stops at station B to a range including an extended positioning range on the side where the door opens.

Here, it is assumed that the first positioning server positions the train car, and the second positioning server positions the platform in a system. In this case, at the train station where the train car leaves, positioning range judging section 21 may determine that the positioning range of the first positioning server is only the fixed positioning range (inside the train car) in a period when the door is open since there is no passenger getting off. Here, positioning range judging section 21 may extend the positioning range of the second positioning server on the platform to the fixed positioning range (platform) and the extended positioning range (inside the train car). In contrast, at the last station of the train, positioning range judging section 21 can determine a positioning range between the first positioning server and the second positioning server in converse embodiment.

Alternatively, a case in which a positioning server is installed in an event facility such as a concert hall, and another positioning server performs positioning of a waiting room next to the entrance of the hall is assumed. In this case, the information on the performance time of events such as concerts may be applied as the supplemental information. Based on the information, positioning range judging section 21 can determine only inside the hall as the positioning range during the performance time of the concert. Alternatively, positioning range judging section 21 can change a positioning range after the performance ends or during intermission to include a range outside of the hall such as a waiting room or a lobby (extended positioning range).

Positioning range judging section 21 determines a part to be included in the positioning range and a part to be excluded from the extended positioning range based on each condition, and outputs the information to extended fingerprint managing section 12. Based on the information, extended fingerprint managing section 12 omits the excluded part, and outputs the rest of the extended fingerprint to positioning section 13.

Positioning section 13 positions a client using the extended fingerprint and the fixed fingerprint of the part.

Note that, after determining, in the extended positioning range, a part to be included in the positioning range and a part to be excluded from the positioning range, positioning range judging section 21 may directly output the information to positioning section 13. In this case, positioning section 13 may be configured such that the operation for positioning is performed using only a part included in the positioning range in the extended fingerprint input from extended fingerprint managing section 12.

Furthermore, fingerprint updating section 15 according to Embodiment 2 may update an extended fingerprint as follows. More specifically, in all of the extended positioning range, update frequency of the extended fingerprint at a part included in the positioning range at that point in time is increased, and update frequency of the extended fingerprint excluded from the positioning range at that point in time is reduced. Fingerprint updating section 15 may set the same value to the update frequency of the extended fingerprint at a part included in the positioning range and the update frequency of the fixed fingerprint. By adjusting the update frequency, fingerprint updating section 15 can reduce the processing load without highly affecting the positioning accuracy.

Figure 8:
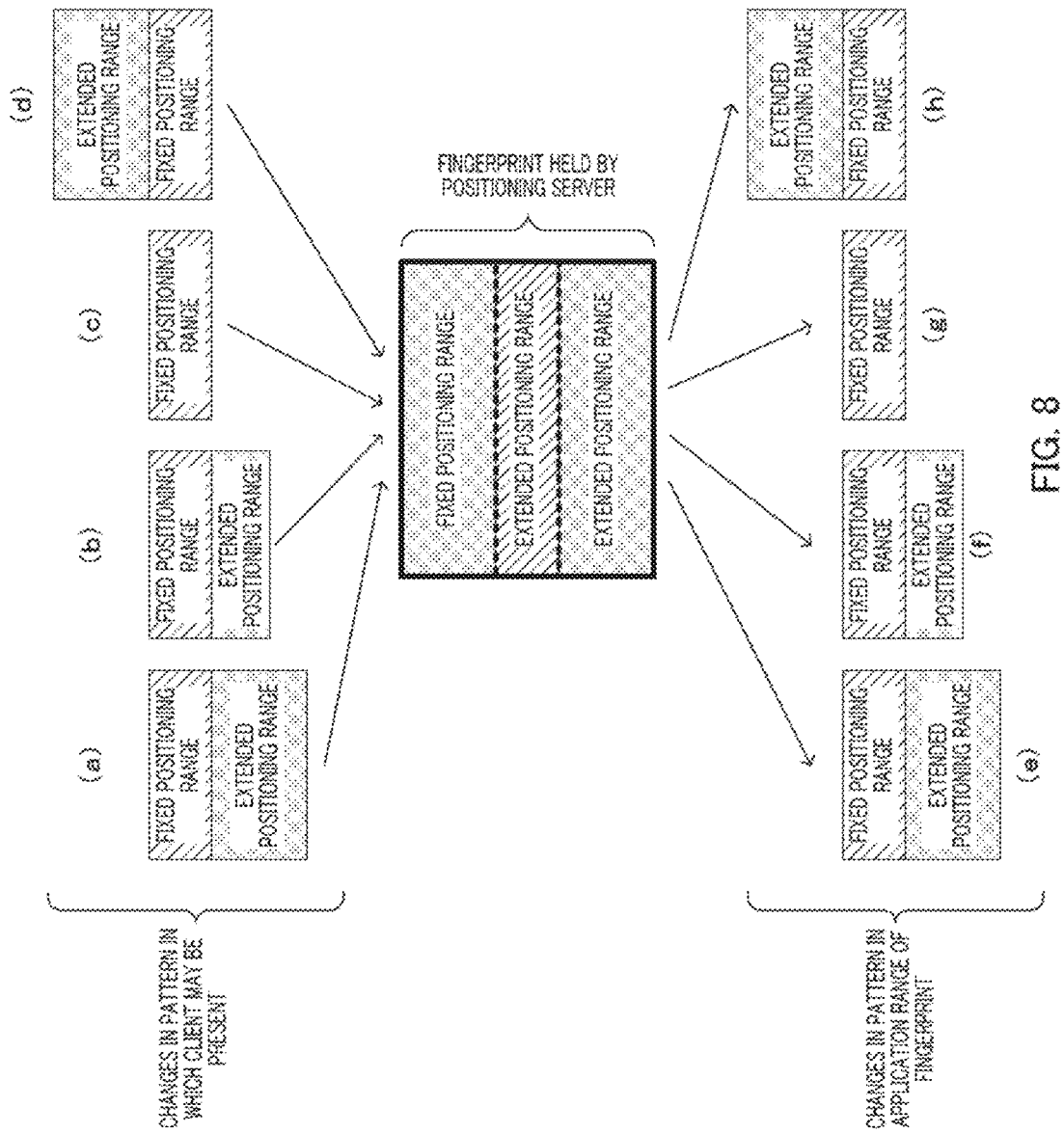
FIG. 8 is a diagram illustrating the correspondence relation between changes in pattern in a range in which a client to be positioned may be present and in an application range of fingerprints.

FIG. 8 illustrates a variation in a range where a client to be positioned may be present and in an application range of the fingerprint (hereafter referred to as the coverage of the fingerprint, or a use range of the fingerprint).

As illustrated in (a) to (d) in FIG. 8, a case in which a range where the client is present changes in all of the positioning ranges is assumed. Even in this case, according to the positioning server according to Embodiment 2, positioning section 13 can change the application range of the extended fingerprint in response to the variation and performs the positioning, as illustrated in FIG. 8(*e*) to (*h*). Accordingly, positioning section 13 omits the calculation comparing RSS reported from the client and the extended fingerprint in an unnecessary part so as to reduce the processing load.

Furthermore, positioning section 13 can avoid calculation of the location of the client as a result of the positioning at a location in a range where the client cannot be present by the positioning error.

Note that, as in the last station where the train turns, if an exit platform and a boarding platform are explicitly specified, positioning range judging section 21 may extend the application range only to the exit platform. With this, the region extension toward a side where the passenger cannot possibly get off is avoided, and positioning section 13 can reduce the positioning complexity and the processing load.

Embodiment 3

Figure 9:
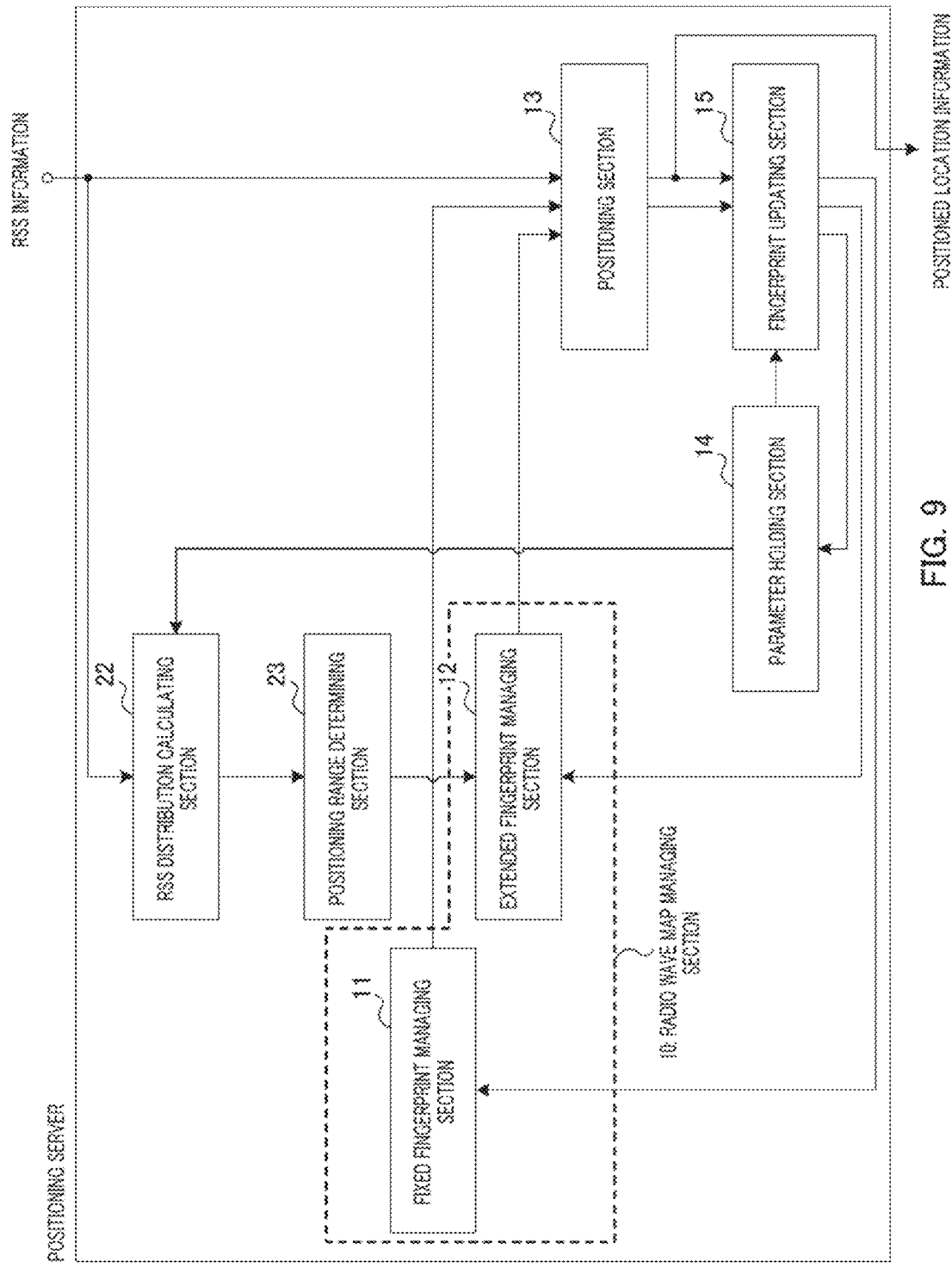
FIG. 9 is a block diagram illustrating a configuration of a positioning server according to Embodiment 3 of the present invention.

FIG. 9 is a block diagram illustrating a configuration of a positioning server according to Embodiment 3 of the present invention. The positioning server according to Embodiment 3 includes RSS distribution calculating section 22 and positioning range determining section 23, in addition to the configuration according to Embodiment 1. The components identical to those in Embodiment 1 are assigned with the same reference numerals, and the detailed description for these components will be omitted.

RSS distribution calculating section 22 calculates an average RSS related to subordinate AP from RSS information reported from the client, and outputs the calculation result to positioning range determining section 23. RSS distribution calculating section 22 manages RSS information reported from the client, with an ID of AP included in RSS information (MAC address and others) and information related to an installed position of AP read from parameter holding section 14.

Upon receiving an input of an average RSS related to AP from RSS distribution calculating section 22, positioning range determining section 23 compares average RSS of the focused part. Based on the comparison result, positioning range determining section 23 determines, in the extended positioning range, a part to be included in the positioning range and a part excluded from the positioning range. Subsequently, positioning range determining section 23 outputs information of the determined positioning range to extended fingerprint managing section 12.

When receiving an input of information on the positioning range determined by positioning range determining section 23, extended fingerprint managing section 12 outputs only data in a part included in a positioning range in the extended fingerprint to positioning section 13.

Next, an operation for determining the positioning range in the positioning server according to Embodiment 3 will be described.

In Embodiment 3, first, RSS distribution calculating section 22 calculates an average value of the measured RSS of the signal to be transmitted from subordinate AP to a client, for all of subordinate APs according to the following Equation 4. Subsequently, RSS distribution calculating section 22 outputs the calculation result to an average RSS corresponding to an installment location of the subordinate AP.

$$\text{Average } RSS \text{ at } AP\#k = \sum_{x=0}^{X-1} RSS_{meas}(k)(x)/X \quad \text{(Equation 4)}$$

$RSS_{meas}(k)(x)$: RSS of AP#k measured by client x
X: The number of clients received report on RSS of AP#k Here, it is assumed that all of subordinate APs transmit signals at the same transmission power. When not all of subordinate AP sends signals at the same transmission power, RSS distribution calculating section 22 may divide an average value of RSS of subordinate AP by the transmission power of AP, and standardize the values such that the values can be compared as represented by Equation 5.

$$\text{Average } RSS \text{ at } AP\#k = \frac{\left(\sum_{x=0}^{X-1} RSS_{meas}(k)(x)/X\right)}{P_{tx}(k)} \quad \text{(Equation 5)}$$

Figure 10A:
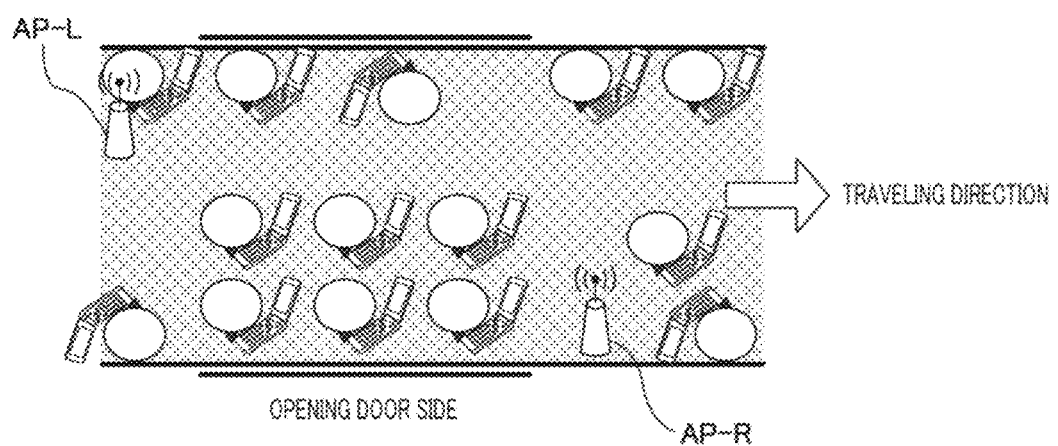
FIGS. 10A and 10B illustrate a method for determining a door-opening/closing side based on a distribution of density of clients.
Figure 10B:
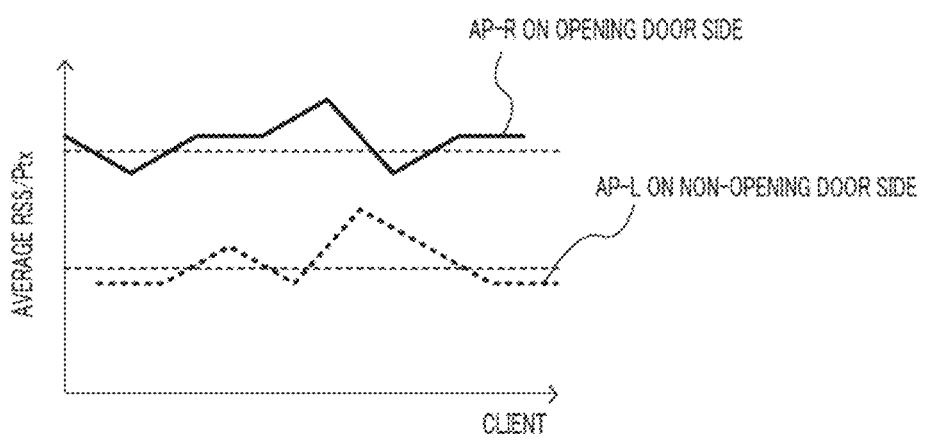
Figure 11:
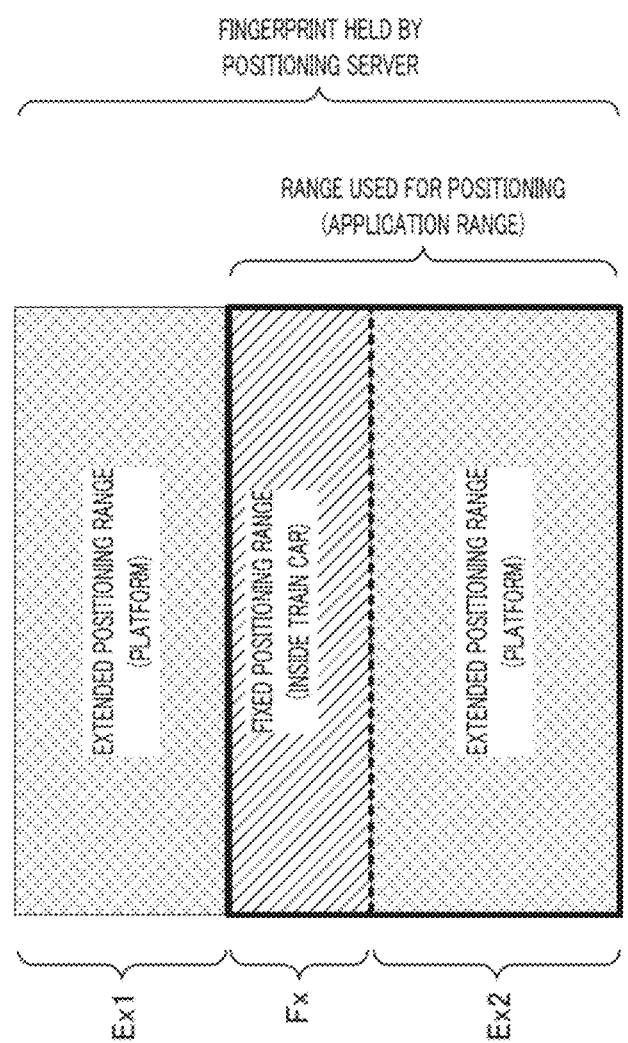
FIG. 11 illustrates an example of changes in a positioning range according to Embodiment 3.

$RSS_{meas}(k)(x)$: RSS of AP#k measured by client x
X: The number of clients received report on RSS of AP#k
$P_{tx}(k)$: Transmission power of AP#k FIGS. 10A and 10B are diagrams for describing a method for calculating a side of the car where the doors open, based on the density distribution of the client. FIG. 11 illustrates a diagram for describing an example of changes in the positioning range in Embodiment 3.

Subsequently, with reference to FIGS. 10A and 10B, a case in which the positioning server is installed on a train car is specifically described. In this case, the fixed positioning range is inside the train car, and the extended positioning range is the platform.

Usually, a client (a passenger carrying a client is simply referred to as a client) who is to get off the train at the next station tends to move toward a door which opens at the next stop. In contrast, it is assumed that clients who are not going to get off are present evenly in the car. Since the client measures and reports RSS from almost all of AP installed in the train car (fixed positioning range), when there is unevenness in the distribution of clients, RSS of AP installed on the side where the distribution density of the client is larger (alternatively, the value calculated by Equation 5).

Accordingly, when receiving an input of an average RSS with regard to AP from RSS distribution calculating section 22, positioning range determining section 23 determines that the positioning range is not extended to a side where an AP having a smaller average RSS is installed. This is because it is assumed that the doors on the opposite side will open. Subsequently, positioning range determining section 23 determines that range Ex1 having a smaller average RS S in the extended positioning range (Ex1 and Ex2 in FIG. 11) is excluded from the positioning range. Furthermore, positioning range determining section 23 outputs information of the determined positioning range (Fx, Ex2) to extended fingerprint managing section 12.

Extended fingerprint managing section 12 outputs an extended fingerprint in a range used for positioning to positioning section 13, according to the information from positioning range determining section 23.

RSS distribution calculating section 22 and positioning range determining section 23 repeatedly perform the calculation of the average RSS and the determination on the positioning range in a predetermined cycle. Subsequently, the direction where AP having a smaller average RSS is installed changes from the left side to the right side with respect to the travelling direction of the train, for example, positioning range determining section 23 changes, in extended positioning ranges Ex1 and Ex2, the part to be excluded from the positioning range from one range Ex1 to the other range Ex2.

As described above, according to the positioning server in Embodiment 3, a range in which the client cannot be present is excluded from the positioning range. As a result, the positioning server can avoid erroneously calculating the positioning result of the client as a location in a range where the client cannot be present. Therefore, degradation on the positioning accuracy of the client can be reduced.

In addition, by limiting the positioning range, positioning section 13 and others can reduce the complexity, reducing the time necessary for calculating the positioning result. The reduction is very effective when positioning a large number of clients in a short period of time such as a time when the train car is stopped, for example.

Note that, as a method for determining the positioning range, the following method may be adopted in addition to the method based on the distribution of the client described above. For example, when positioning range determining section 23 inputs door opening/closing sensor information from outside and all of the doors are closed, positioning range determining section 23 may determine only the fixed positioning range as the positioning range (all of the extended positioning ranges are excluded). When positioning range determining section 23 inputs speed sensor information of a train car from outside and determines that the train car is running based on the speed sensor information, positioning range determining section 23 may determine only the fixed positioning range as the positioning range (all of the extended positioning ranged are excluded). Positioning range determining section 23 may be configured to receive, from outside, an input of information on a platform for a train to arrive at. Positioning range determining section 23 may determine a side of the train including doors to open based on the information, and determines a range to be excluded from the positioning range in the extended positioning range. Furthermore, the positioning system holds a database of stops including the data on widths of platforms, and positioning range determining section 23 may exclude a part of the extended positioning range exceeding the platform width from the positioning range, based on the information in the database of stops.

As described above, the positioning server can reduce the size of hardware or the processing load by using external information input for use that has already provided for another purpose.

Embodiment 4

Figure 12:
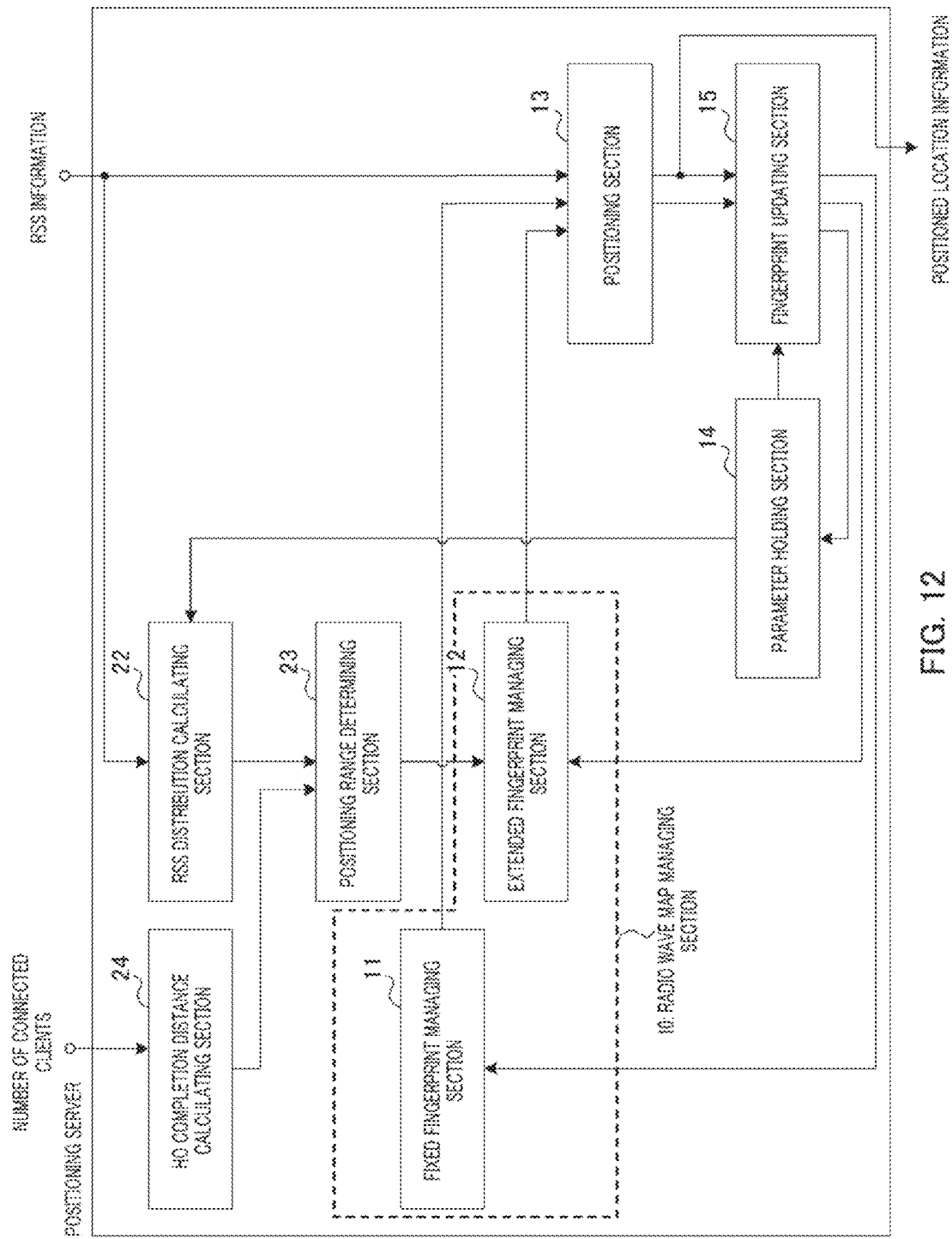
FIG. 12 is a block diagram illustrating a configuration of a positioning server according to Embodiment 4 of the present invention.

FIG. 12 is a block diagram illustrating a configuration of a positioning server according to Embodiment 4 of the present invention. The positioning server according to Embodiment 4 includes HO completion distance calculating section 24 (HO: handover), in addition to the components illustrated in Embodiment 3. The components identical to those in Embodiment 3 are assigned with the same reference numerals, and the detailed description for these components shall be omitted.

The positioning server according to Embodiment 4 includes a functional section managing call connection and movement management of the client. Subsequently, HO completion distance calculating section 24 inputs the number of all of clients connected to subordinate AP from the functional section. Note that, when the call connection management apparatus is separately configured from the positioning server, HO completion distance calculating section 24 may receive information on the number of connection clients from the call connection management apparatus.

HO completion distance calculating section 24 inputs information on the number of connected clients from the input terminal, and determines a congestion degree from the number of connected clients. HO completion distance calculating section 24 then calculates the longest travelling distance that a client moving from the fixed positioning range to the extended positioning range can travel before HO to a subordinate AP of another positioning server is completed, based on the congestion degree. Subsequently, HO completion distance calculating section 24 outputs the information on the travelling distance to positioning range determining section 23.

First, as described in Embodiment 3, positioning range determining section 23 determines, among extended positioning ranges set on one side and the other side of the fixed positioning range, an extended positioning range to be included in the positioning range and an extended positioning range excluded from the positioning range. Subsequently, positioning range determining section 23 determines a size of the extended positioning range to be included in the positioning range, based on the information from HO completion distance calculating section 24. Stated differently, positioning range determining section 23 determines a size of the extended positioning range to be included in the positioning range, reflecting the travelling distance before HO is completed. Subsequently, positioning range determining section 23 outputs information of the determined positioning range to extended fingerprint managing section 12.

Figure 13A:
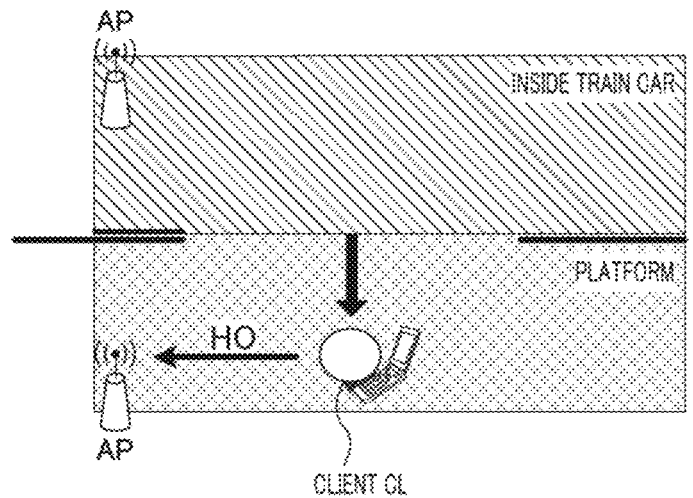
FIGS. 13A and 13B illustrate a relationship between a congestion degree of clients and a hand-over time.
Figure 13B:
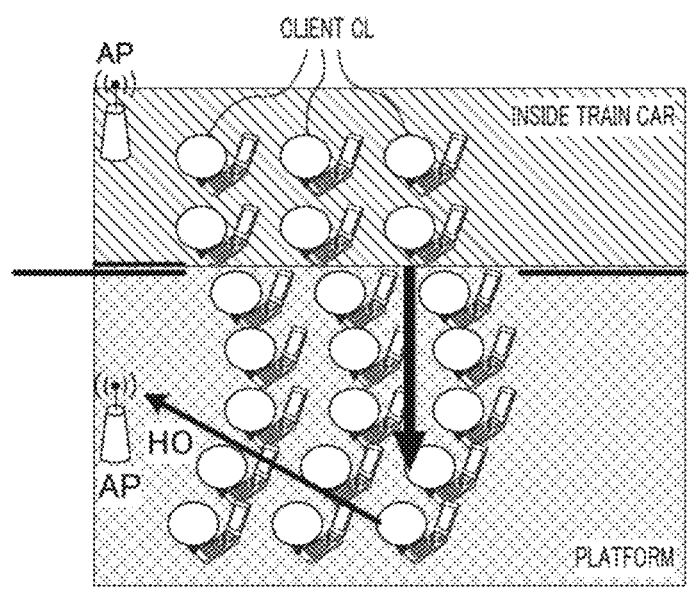

FIGS. 13A and 13B illustrate a relationship between the congestion degree of the clients and a time necessary for HO.

As a specific example, a case in which the positioning server is installed on a train car, and a client is getting off the train car will be described. In this case, the fixed positioning range is inside the train car, and the extended positioning range is the platform.

As illustrated in FIG. 13A, when small number of passengers is getting off the train, the passenger who is getting off the train walks fast, and it takes a short time to complete HO for all of the clients who are the passengers getting off the train. In contrast, as illustrated in FIG. 13B, when a large number of passengers are getting off the train, the passengers getting of the train walk slowly, and it takes longer to complete HO for all of the clients who are the passengers getting off the train.

Upon receiving an input of the information on the number of connected clients, HO completion distance calculating section 24 calculates an approximate estimation value of the number of clients getting off the train car, based on the information. For example, when vehicle occupancy is 100% (approximately 170 passengers are present per car), HO completion distance calculating section 24 estimates that approximately 30 passengers are getting off the train per car, supposing that a ratio of the number of the passengers on the train and the passengers is constant.

In addition, based on the estimated number of passengers getting off the train described above, HO completion distance calculating section 24 calculates a travelling distance of the client before HO is completed as follows, in consideration of the statuses illustrated in FIGS. 13A and 13B. For example, for a train having 8 cars, when it is estimated that 30 clients get off the train per car, HO completion distance calculating section 24 sets the walking speed in the congestion degree at 0.5 km/h (Usually, the walking speed of adult is considered as approximately 3 km/h, and the walking speed of 3 km/h is determined as one of the propagation environment model in the performance test of 3GPP (3rd Generation Partnership Project). Accordingly, a speed of walking a crowded platform after getting off an extremely crowded train is estimated to be approximately 0.5 km/h). Subsequently, HO completion distance calculating section 24 calculates, setting a time before HO for one client is completed as 0.5 s, a distance that a client can move forward before HO is completed as 17 [m] (≈8× 30×0.5×500/3600). When the train is not crowded and it is estimated one client gets off per car, HO completion distance calculating section 24 sets the walking speed at the congestion degree as 2.0 km/h (2 km/h is determined as a walking speed slightly slower than the average walking speed). Subsequently, HO completion distance calculating section 24 calculates, setting a time before HO for one client is completed as 0.5 s, a distance that a client can move forward before HO is completed as 2.2 [m] (≈8×1×0.5×2000/3600).

Note that, HO completion distance calculating section 24 may set a walking speed based on data such as age groups of passengers or time periods. For example, when the age group is high (elderly people are assumed), the walking speed may be set as slow, and when the age group is low (young people and children are assumed), the walking speed may be set as fast. Alternatively, HO completion distance calculating section 24 may set the walking speed as fast when the traffic flow is large during the rush hour, for example, and may set the walking speed as slow when the traffic flow is small during daytime or at night, for example.

Figure 14:
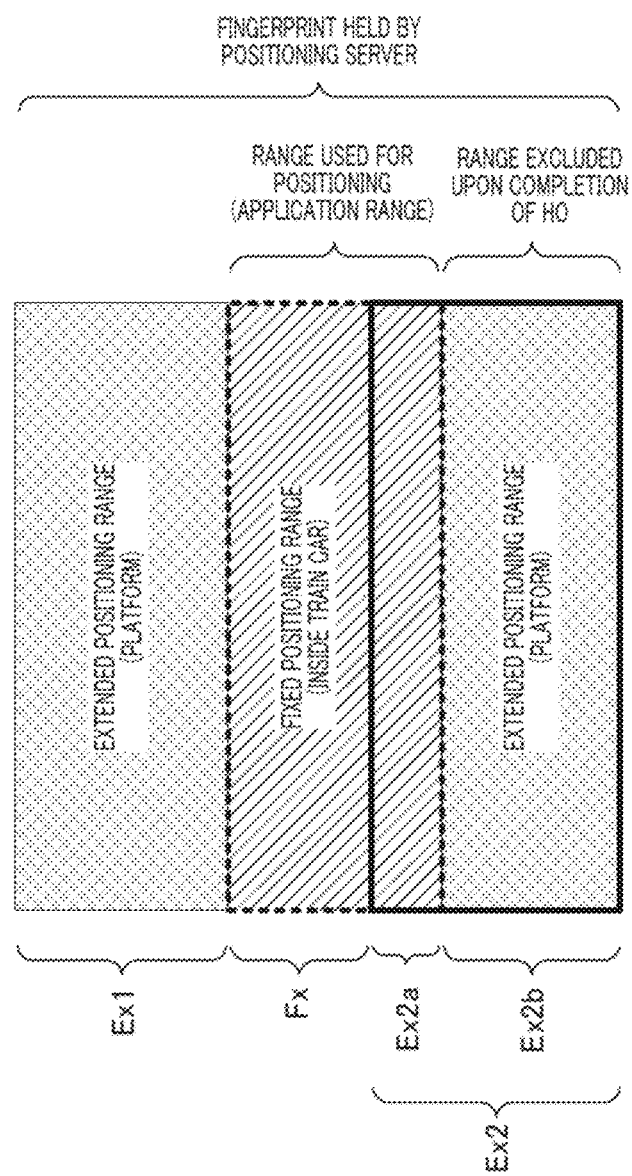
FIG. 14 illustrates an example of changes in a positioning range according to Embodiment 4.

FIG. 14 illustrates an example of change in the positioning range according to Embodiment 4.

First, it is assumed that positioning range determining section 23 determines that, from extended positioning ranges Ex1 and Ex2, positioning range Ex1 is excluded from the positioning range because it is determined that doors do not open on the side of extended positioning range Ex1. In this case, positioning range determining section 23 subsequently determines whether or not a range that the client cannot be present is included in extended positioning range Ex2 which is not excluded, based on a calculation result input from HO completion distance calculating section 24 (the largest travelling distance of the client). More specifically, when the largest travelling distance of the client before HO is completed is larger than the width of extended positioning range Ex2 on one side, positioning range determining section 23 determines that range Ex2 does not include a range that the client cannot be present. If it is the opposite, positioning range determining section 23 determines that range Ex2 includes a range where the client cannot be present. If the determination result is the former, positioning range determining section 23 does not change the positioning range from fixed positioning range Fx and Ex2 which is one of the extended positioning ranges that have already been determined. If the determination result is the latter, positioning range determining section 23 determines that a part Ex2b where the client cannot be present in the non-excluded part Ex2 of the extended positioning range is excluded from the positioning range, and determines that the remaining part Ex2a of the extended positioning range as a part to be included in the positioning range. Subsequently, positioning range determining section 23 outputs information of the positioning range to extended fingerprint managing section 12.

HO completion distance calculating section 24 and positioning range determining section 23 repeat the calculation described above and the determination on the positioning range in a predetermined cycle, and changes the positioning range according to the calculation result each time.

As described above, according to the positioning server apparatus according to Embodiment 4, positioning range determining section 23 further excludes, from the positioning range, a part of the extended positioning range where the client to be positioned cannot proceed due to the congestion degree of the clients. With this process, it is possible to prevent the positioning result of the clients from appearing erroneously in a range where the client cannot be present. Therefore, degradation on the positioning accuracy of the client can be reduced.

In addition, by limiting the positioning range, positioning section 13 and others can reduce the complexity, reducing the time necessary for calculating the positioning result. The reduction is very effective when positioning a number of clients in a short period of time such as a time when the train car is stopped, for example.

Note that, in order to estimate the number of clients getting off the train more accurately, the positioning server may receive information on the commuter passes (destinations) of passengers passing the gate from a managing server apparatus at a railway facility, and add the information on the commuter passes to a determination on the number of clients getting off the train for each stop. In order to calculate the congestion degree in the train car, the positioning server may input a weight sensor of the train car, and calculate the congestion degree including the information.

As described above, by using additional information, HO completion distance calculating section 24 can estimate the time before HO is completed more accurately. With this, positioning range determining section 23 can limit the positioning range to a necessary and sufficient range more accurately, and the positioning server can reduce the processing load.

Embodiment 5

Figure 15:
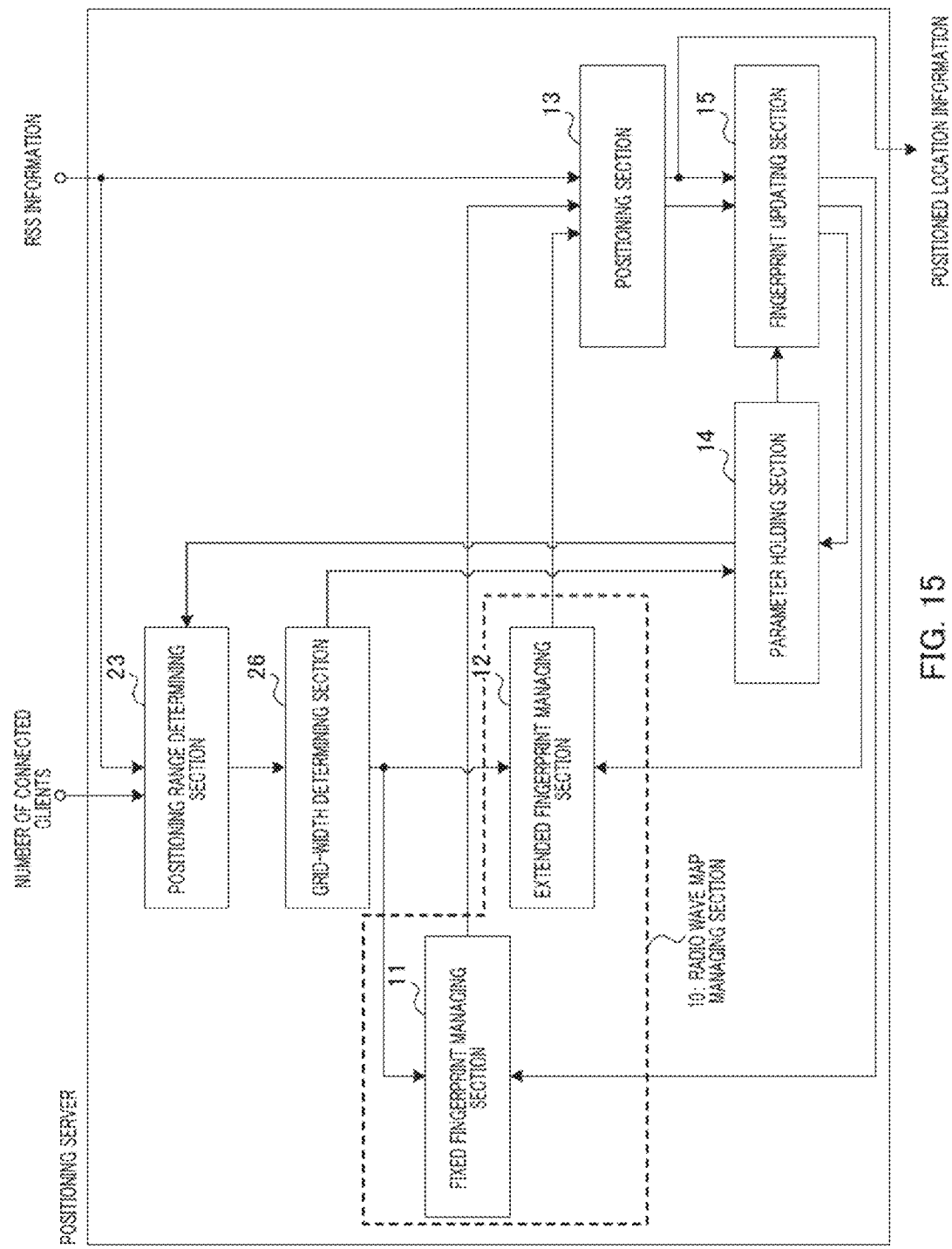
FIG. 15 is a block diagram illustrating a configuration of a positioning server according to Embodiment 5 of the present invention.

FIG. 15 is a block diagram illustrating a configuration of a positioning server according to Embodiment 5 of the present invention. The positioning server according to Embodiment 5 includes positioning range determining section 23 and grid-width determining section 26, in addition to the configuration according to Embodiment 1. The components identical to those in Embodiment 1 are assigned with the same reference numerals, and the detailed description for these components shall be omitted.

Note that, positioning range determining section 23 may be configured to include RSS distribution calculating section 22 and HO completion distance calculating section 24 according to Embodiment 4. In this case, positioning range determining section 23 inputs the number of connected clients, as illustrated in FIG. 15. Alternatively, positioning range determining section 23 may be configured to variably determine a positioning range in a method other than the methods described in Embodiment 3 and Embodiment 4.

Upon receiving information on the positioning range from positioning range determining section 23, grid-width determining section 26 calculates a grid width according to the positioning range. The calculation method will be described later. When the calculated grid width is smaller than the grid width set at that point in time, grid-width determining section 26 determines, by interpolation, a reference RSS at a grid point to be added due to the narrow grid width. Subsequently, grid-width determining section 26 outputs information on the calculated grid width and information on the interpolated reference RSS to fixed fingerprint managing section 11 and extended fingerprint managing section 12.

Note that, the interpolation on reference RSS may be performed by fixed fingerprint managing section 11 and extended fingerprint managing section 12, instead of grid-width determining section 26. Alternatively, the interpolation may be omitted if fixed fingerprint managing section 11 and extended fingerprint managing section 12 calculate the reference RSS at each grid point based on the set parameter each time, and provide the calculated reference RSS to positioning section 13.

Next, the positioning process according to Embodiment 5 will be described.

In Embodiment 5, the total number of the grid points set when the fixed positioning range and all of extended positioning ranges are included in the positioning range is set as a default value in grid-width determining section 26 in advance.

Upon receiving an input of the information on the positioning range from positioning range determining section 23, grid-width determining section 26 calculates a grid width such that as many grid points are set as possible without exceeding a maximum value of the grid points which is a default value of the total number of the grid points, and determines the grid width. Subsequently, grid-width determining section 26 outputs the determined grid width to parameter holding section 14.

As a specific example, a case in which the entire positioning range is 13 m×20 m (the fixed positioning range is 3 m×20 m, and the extended positioning range is 5 m×20 m×2), and the default grid width is 1 m×1 m is assumed. In this case, the total number of default grid points is 21×14=294. For example, grid-width determining section 26 holds the data in Table 1, and determines the grid width according to the information on the positioning range provided from positioning range determining section 23, while determining the total number of the default grid point as the maximum value.

TABLE 1

| Positioning Range | Grid Width | Total Grid Count |
| --- | --- | --- |
| A + B/2 < x ≤ A + B | 1 m × 1 m | 294 |
| A < x ≤ A + B/2 | 0.67(⅔) m × 1 m | 294 |
| A | 0.5 m × 0.5 m | 287 |

Figure 16:
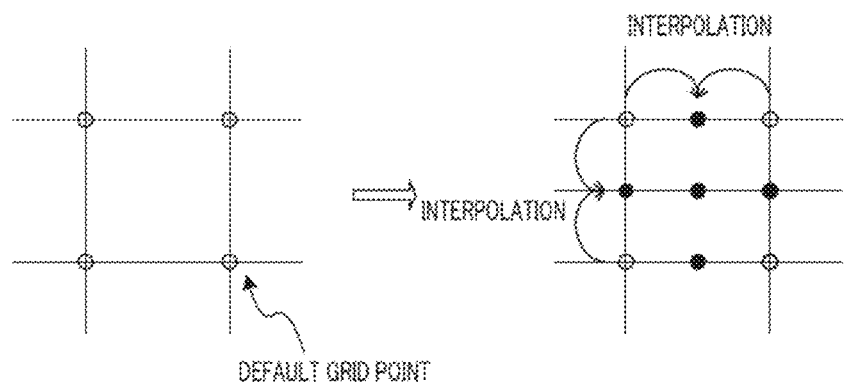
FIG. 16 illustrates an example of a change in distances in a grid.
Figure 17:
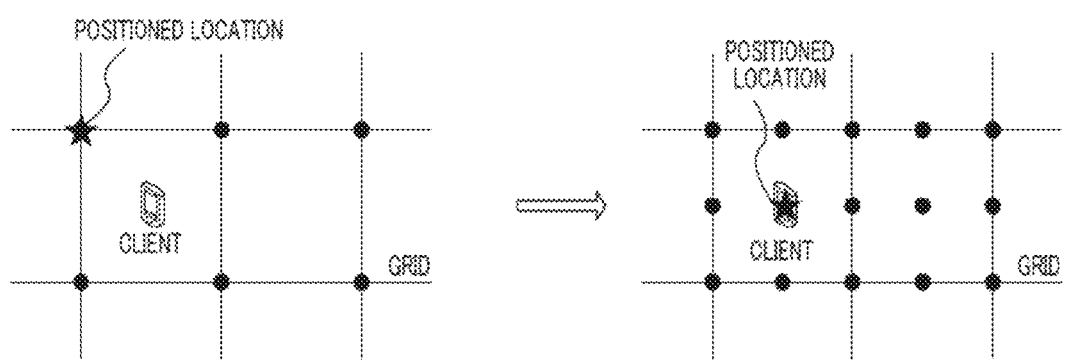
FIG. 17 illustrates an effect due to a change in distances in a grid.

A: Fixed positioning range: 3 m × 20 m
B: Total extended positioning range 10 m × 20 m FIG. 16 illustrates an example of a change in the grid distance, and FIG. 17 illustrates an effect achieved by the change in the grid distance. In the diagrams, the grid points are illustrated in black dots.

Subsequently, grid-width determining section 26 interpolates a fingerprint according to the grid width determined as described above. When there is no change in the determined grid width from the grid width set at that point in time, grid-width determining section 26 does not perform the interpolation.

When the determined grid width has changed from a default value (1 m×1 m) to 0.5 m×0.5 m as illustrated in FIG. 16, for example, grid-width determining section 26 additionally sets grid points between default grid points. Subsequently, grid-width determining section 26 calculates RSS at a grid point to be added using the following information 1 or information 2 by interpolating RSS at the grid points to be added (by performing linear interpolation on the reference RSS at grid points interposing a newly added grid point, in a simplified manner): 1 Reference RSS at the default grid point; and 2 A path loss coefficient used for calculating the reference RSS. Grid-width determining section 26 outputs the reference RSS at the newly added grid point obtained by the interpolation. If the grid point is in the fixed positioning range, the reference RSS is output to fixed fingerprint managing section 11. Alternatively, if the grid point is in the extended positioning range, the reference RSS is output to extended fingerprint managing section 12. Fixed fingerprint managing section 11 and extended fingerprint managing section 12 add reference RSS at the newly added grid points to their fingerprints.

According to the positioning server apparatus according to Embodiment 5, when the positioning range is narrowed, grid-width determining section 26 narrows the grid distance in the fingerprint in a range that does not significantly change the total number of grid points. Accordingly, positioning section 13 improves the positioning accuracy by improving the resolution without markedly changing the load on operation. For example, as illustrated in FIG. 17, when the grid width is wide and an accurate location of the client is in the middle of the grid points, positioning section 13 can calculate an accurate positioning location by narrowing the grid width.

Embodiment 6

Figure 18:
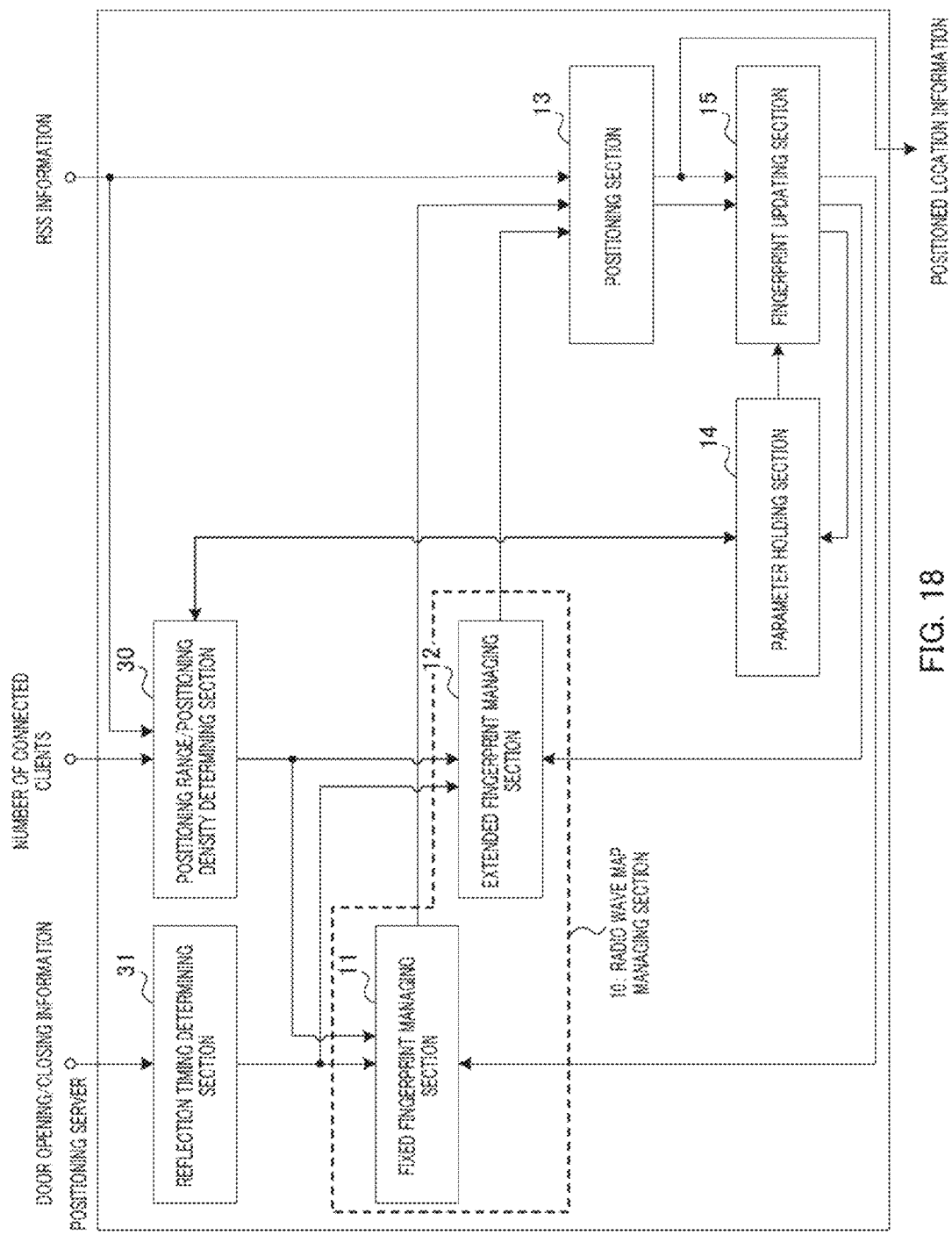
FIG. 18 is a block diagram illustrating a configuration of a positioning server according to Embodiment 6 of the present invention.

FIG. 18 is a block diagram illustrating a configuration of a positioning server according to Embodiment 6 of the present invention. The positioning server according to Embodiment 6 includes positioning range/positioning density determining section 30 and reflection timing determining section 31, in addition to the configuration according to Embodiment 1. The components identical to those in Embodiment 1 are assigned with the same reference numerals, and the detailed description for these components will be omitted.

Note that, positioning range/positioning density determining section 30 may be configured to include the positioning range determining section 23 and grid-width determining section 26 according to Embodiment 5. In this configuration, when positioning range determining section 23 is configured to include RSS distribution calculating section 22 and HO completion distance calculating section 24 according to Embodiment 4, positioning range/positioning density determining section 30 inputs the number of connected clients, as illustrated in FIG. 18. Alternatively, positioning range determining section 23 in positioning range/positioning density determining section 30 may be configured to variably determine a positioning range in a method other than the methods described in Embodiment 3 and Embodiment 4. Positioning range/positioning density determining section 30 may omit the configuration for changing the grid width.

Reflection timing determining section 31 inputs opening/closing information of the doors from a door opening/closing sensor outside, through an input terminal. In general, the positioning range is extended when the doors opens, due to people entering/leaving the car through the doors, and the positioning range is reduced when the doors are closed, since people cannot enter/leave the car through the doors. Stated differently, the positioning range may change due to opening/closing of the doors. Accordingly, when receiving an input of information for opening the doors, reflection timing determining section 31 determines that it is the timing when the positioning range may change. Subsequently, reflection timing determining section 31 outputs a trigger signal reflecting the output from positioning range/positioning density determining section 30 to fixed fingerprint managing section 11 and extended fingerprint managing section 12.

The information on the change in the positioning range and the positioning density is determined by positioning range/positioning density determining section 30, and the information is output to fixed fingerprint managing section 11 and extended fingerprint managing section 12. Note that, the positioning density denotes the number of grid points per unit area in a positioning range (positioning area). Stated differently, if the positioning range is limited and the number of grid points is in a constant value, the positioning density is increased.

When an input of a trigger signal is received from reflection timing determining section 31, fixed fingerprint managing section 11 and extended fingerprint managing section 12 reflect an input from positioning range/positioning density determining section 30. Subsequently, fixed fingerprint managing section 11 and extended fingerprint managing section 12 output the information on the reflected fingerprint to positioning section 13.

According to the positioning server according to Embodiment 6, positioning range determining section 23 can change the positioning range and (or) the positioning density with appropriate timing. Positioning section 13 can perform positioning based on the changed positioning range and (or) the positioning density with appropriate timing. Accordingly, positioning range determining section 23 can avoid change in the positioning range and (or) the positioning density with timing in which the positioning range cannot change. With this process, positioning section 13 can avoid calculating a position where the client cannot be present as a positioning result, and reduce the degradation on the positioning accuracy of the client. The positioning server can also reduce the processing load on each section, omitting unnecessary operation.

Embodiments of the present invention have been described above. Note that, in each Embodiment, cases in which the present invention is applied to a positioning server in the train car have been used as specific examples. However, the present invention can achieve the same effects when applied to a positioning server installed on the platform, for example. When the positioning server is installed on the platform, the fixed positioning range is a region on the platform, and the extended positioning range is a region inside the train car stopped at the platform. Subsequently, the positioning server can avoid the degradation on accuracy caused by a client moving from the platform to the train car.

In Embodiments, cases in which positioning servers are installed in the train car and on the platform are used as specific examples. However, the present invention may be applied to a positioning server installed in various facilities to achieve the same effects. For example, the present invention is effectively applied to a system in a concert venue in which the first positioning server is installed in a hall for positioning a client inside the hall, and the second positioning server is installed in a waiting room next to the hall through a door for positioning a client inside the waiting room. In this case, the first positioning server sets the region inside the hall as the fixed positioning range, and sets the region inside the waiting room as the extended positioning range. The second positioning server sets the region inside the hall as the fixed positioning range, and sets the region inside the waiting room as the extended positioning range. Even in this case, the positioning server can avoid degradation on the accuracy caused by a client moving from the fixed positioning range to the extended positioning range.

Alternatively, in Embodiments, the radio wave map data refers to a fingerprint which presumably represents a corresponding relationship between RSS of the wireless signal transmitted from AP to the client, and the spatial location. However, the radio wave map data is not limited to the fingerprint described above. For example, data representing, in estimation, a correspondence relation between various physical amount of wireless signal transmitted from AP to the client (physical amount having values that change according to the measured position: for example, delay in signal arrival time, angle of arrival, and so on) and the spatial location may be applied as the radio wave map data. In this case, the client measures the physical amount described above for a wireless signal transmitted from AP, and reports the measured value to the positioning server. The positioning server can calculate the positioned location by matching the measured value and the radio wave map data.

Furthermore, in Embodiments above, the configuration corresponding to the radio wave map managing section is referred to as fixed fingerprint managing section 11 and extended fingerprint managing section 12, since the sections manage fingerprints. In addition, in each Embodiment, the fingerprint in the fixed positioning range and the fingerprint in the extended positioning range are managed in separate blocks by fixed fingerprint managing section 11 and extended fingerprint managing section 12, respectively. However, the fingerprint in the fixed positioning range and the fingerprint in the extended positioning range may be managed in a state where the managing section in one block distinguishes the fingerprints separately.

In Embodiments, an apparatus to be positioned through communication with AP is referred to as a client. The client may also be referred to as a terminal, MS (Mobile Station), and UE (User Equipment). Alternatively, AP may independently position a client by allowing one AP to have a plurality of antennas or implementing function obtained by applying another technology using information other than RSS obtained by the client (for example, information obtained by an autonomous sensor) to the positioning in combination with the present invention. To put it differently, the client can be positioned by at least one AP.

Alternatively, each functional block of the positioning server illustrated in Embodiments may be implemented by hardware or software which functions by implementation of a program by a computer.

Functional sections used in Embodiments described above may be typically configured as an LSI (Large Scale Integration), which is an integrated circuit. Each functional section may be individually implemented as one chip, or a plurality of functional sections may be integrated into one chip. The LSI (large scale integration) may be IC (integrated circuit), a system LSI, a super LSI, or an ultra LSI, depending on the degree of integration. The LSI may be implemented by a dedicated circuit or a general-purpose processor. Alternatively, the LSI may be an FPGA (field programmable gate array) that can be programmed after fabrication, or a configurable processor having connection or settings of circuit cells in the LSI that can be reconfigured. Furthermore, functional sections of the stereo image processing apparatus may be implemented as integration by a technology for other integration replacing LSI, along with the progress in the semiconductor technology and another technology derived. For example, application of the bio technology is one possibility.

With the description above, the present disclosure may be summarized as follows as an example.

The first disclosure is a positioning server apparatus including: an input section that inputs measurement information of a radio wave transmitted between an access point and a client; a radio wave map managing section that manages radio wave map data representing a correspondence relation between the measurement information and a spatial location; and a positioning section that measures a location of the client based on the measurement information and the radio wave map data, in which the radio wave map managing section manages first map data and second map data as the radio wave map data, the first map data related to a fixed positioning range where there is a possibility that the client to be positioned is present during normal operation, and the second map data related to an extended positioning range where there is possibility that the client to be positioned is present under a specific condition.

The second disclosure is a positioning server apparatus according to the first disclosure, in which the extended positioning range is a range overlapping a fixed positioning range of another positioning server apparatus.

The third disclosure is a positioning server apparatus according to the first disclosure, further including a data updating section that recalculates a parameter in the radio wave map data based on the measurement information and a measurement result by the positioning section to update the radio wave map data, in which the data updating section updates the first map data and the second map data, based on the parameter recalculated for the fixed positioning range.

The fourth disclosure is a positioning server apparatus according to the first disclosure, further including a data updating section that updates the radio wave map data based on the measurement information and a measurement result by the positioning section, in which the data updating section updates the second map data in frequency less than update frequency of the first map data.

The fifth disclosure is a positioning server apparatus according to the first to fourth disclosure, further including a range control section that changes a positioning range of the positioning section within the fixed positioning range and the extended positioning range.

The sixth disclosure is a positioning server apparatus according to the fifth disclosure, in which the range control section determines a size or a part of the extended positioning range to be included in the positioning range of the positioning section, based on density or distribution of a plurality of clients each of which corresponds to the client.

The seventh disclosure is a positioning server apparatus according to the fifth disclosure, further including a supplementary information input section that inputs a state regarding a boundary between the fixed positioning range and the extended positioning range, in which the range control section changes the positioning range of the positioning section, based on the supplemental information.

The eighth disclosure is a positioning server apparatus according to the fifth disclosure, in which the positioning section sets a plurality of positioning candidate points in the positioning range and performs a calculation processing on the positioning candidate points to measure a location of the client, and changes a distance between the positioning candidate points according to a size of the positioning range.

The ninth disclosure is a positioning control method including: inputting measurement information of a radio wave transmitted between an access point and a client; measuring a location of the client based on the measurement information and radio wave map data representing a correspondence relation between the measurement information and a spatial location; and updating the radio wave map data based on the measurement information and a positioning result of the client, in which the radio wave map data includes first map data related to a fixed positioning range where there is a possibility that the client to be positioned is present during normal operation and second map data related to an extended positioning range where there is possibility that the client to be positioned is present under a specific condition.

The tenth disclosure is a positioning control method according to the ninth disclosure, further including changing a positioning range within the fixed positioning range and the extended positioning range, before measuring the location of the client.

The disclosure of Japanese Patent Application No. 2011-172433, filed on Aug. 5, 2011, including the specification, drawings and abstract, is incorporated herein by reference in its entirety.

INDUSTRIAL APPLICABILITY

The present invention is applicable to a positioning server apparatus and a positioning control method thereof added to a system performing wireless communication between an AP and client through WLAN for positioning a client.

REFERENCE SIGNS LIST

10 Radio wave map managing section
11 Fixed fingerprint managing section
12 Extended fingerprint managing section
13 Positioning section
14 Parameter holding section
15 Fingerprint updating section
21 Positioning range judging section
22 RSS distribution calculating section
23 Positioning range determining section
24 HO completion distance calculating section
Fx Fixed positioning range
EX1, Ex2 Extended positioning range
26 Grid-width determining section
30 Positioning range/positioning density determining section
31 Reflection timing determining section
CL1 Client
AP1, AP2 Access point
SV1 Positioning server

The invention claimed is:

1. A positioning server apparatus comprising:
   an input section that inputs measurement information of a radio wave transmitted between an access point and a client;
   a radio wave map managing section that manages radio wave map data representing a correspondence relation between the measurement information and a spatial location; and
   a positioning section that measures a location of the client based on the measurement information and the radio wave map data, wherein the radio wave map managing section manages first map data and second map data as the radio wave map data, the first map data related to a fixed positioning range where there is a possibility that the client to be positioned is present during normal operation, and the second map data related to an extended positioning range where there is possibility that the client to be positioned is present under a specific condition.

2. The positioning server apparatus according to claim 1, wherein the extended positioning range is a range overlapping a fixed positioning range of another positioning server apparatus.

3. The positioning server apparatus according to claim 1, further comprising
   a data updating section that recalculates a parameter in the radio wave map data based on the measurement information and a measurement result by the positioning section to update the radio wave map data, wherein the data updating section updates the first map data and the second map data, based on the parameter recalculated for the fixed positioning range.

4. The positioning server apparatus according to claim 1, further comprising
   a data updating section that updates the radio wave map data based on the measurement information and a measurement result by the positioning section, wherein the data updating section updates the second map data in frequency less than update frequency of the first map data.

5. The positioning server apparatus according to claim 1, further comprising
a range control section that changes a positioning range of the positioning section within the fixed positioning range and the extended positioning range.

6. The positioning server apparatus according to claim 5, wherein
the range control section determines a size or a part of the extended positioning range to be included in the positioning range of the positioning section, based on density or distribution of a plurality of clients each of which corresponds to the client.

7. The positioning server apparatus according to claim 5, further comprising
a supplementary information input section that inputs a state regarding a boundary between the fixed positioning range and the extended positioning range, wherein
the range control section changes the positioning range of the positioning section, based on the supplemental information.

8. The positioning server apparatus according to claim 5, wherein
the positioning section sets a plurality of positioning candidate points in the positioning range and performs a calculation processing on the positioning candidate points to measure a location of the client, and changes a distance between the positioning candidate points according to a size of the positioning range.

9. A positioning control method comprising:
inputting measurement information of a radio wave transmitted between an access point and a client;
measuring a location of the client based on the measurement information and radio wave map data representing a correspondence relation between the measurement information and a spatial location; and
updating the radio wave map data based on the measurement information and a positioning result of the client, wherein the radio wave map data includes first map data related to a fixed positioning range where there is a possibility that the client to be positioned is present during normal operation and second map data related to an extended positioning range where there is possibility that the client to be positioned is present under a specific condition.

10. The positioning control method according to claim 9, further comprising changing a positioning range within the fixed positioning range and the extended positioning range, before measuring the location of the client.

* * * * *